US006996832B2

(12) United States Patent
Gunduc et al.

(10) Patent No.: US 6,996,832 B2
(45) Date of Patent: Feb. 7, 2006

(54) SYSTEM AND METHOD FOR SOFTWARE COMPONENT PLUG-IN FRAMEWORK

(75) Inventors: Mesut Gunduc, Califon, NJ (US); Juan Andrade, Chatham, NJ (US); Jeff Michaud, Nashua, NH (US); Paul Patrick, Manchester, NH (US)

(73) Assignee: BEA Systems, Inc., San Jose, CA (US)

( * ) Notice: Subject to any disclaimer, the term of this patent is extended or adjusted under 35 U.S.C. 154(b) by 684 days.

(21) Appl. No.: 09/918,880

(22) Filed: Jul. 31, 2001

(65) Prior Publication Data
US 2003/0110312 A1 Jun. 12, 2003

Related U.S. Application Data

(60) Provisional application No. 60/294,467, filed on May 30, 2001.

(51) Int. Cl.
G06F 9/46 (2006.01)
(52) U.S. Cl. .................................... 719/331; 719/328
(58) Field of Classification Search ................ 719/315, 719/316, 331, 332, 328; 709/203, 217, 219; 707/10
See application file for complete search history.

(56) References Cited

U.S. PATENT DOCUMENTS

| 5,375,241 | A | * | 12/1994 | Walsh ........................ 719/331 |
| 5,506,984 | A | * | 4/1996 | Miller ........................ 707/10 |
| 5,627,888 | A | * | 5/1997 | Croughan-Peeren ... 379/201.03 |
| 5,732,270 | A | * | 3/1998 | Foody et al. ................ 719/316 |
| 5,768,588 | A | * | 6/1998 | Endicott et al. ............. 719/316 |
| 5,822,580 | A | | 10/1998 | Leung ........................ 395/614 |
| 5,872,966 | A | * | 2/1999 | Burg .......................... 719/313 |
| 5,893,106 | A | * | 4/1999 | Brobst et al. ................ 707/102 |
| 6,006,279 | A | * | 12/1999 | Hayes ......................... 719/328 |
| H1853 | H | * | 6/2000 | Wilkiewicz ................. 709/203 |
| 6,182,154 | B1 | * | 1/2001 | Campagnoni et al. ....... 719/315 |
| 6,182,282 | B1 | * | 1/2001 | Stoodley et al. ............ 717/116 |
| 6,222,916 | B1 | * | 4/2001 | Cameron et al. ....... 379/207.03 |
| 6,356,957 | B2 | * | 3/2002 | Sanchez et al. ............. 719/328 |
| 6,633,923 | B1 | * | 10/2003 | Kukura et al. ............... 719/316 |
| 6,757,720 | B1 | * | 6/2004 | Weschler, Jr. ............... 709/220 |
| 2004/0049481 | A1 | * | 3/2004 | Blevins ........................ 707/1 |
| 2004/0068728 | A1 | * | 4/2004 | Blevins ........................ 718/100 |
| 2004/0111525 | A1 | * | 6/2004 | Berkland et al. ............ 709/231 |

FOREIGN PATENT DOCUMENTS

EP 1 037 142 A2 9/2000

OTHER PUBLICATIONS

IBM TDB, "Reusable Object Oriented Framework for Plug Compatible Applications", Mar. 1995, pp. 567-574.*
M. Fayad, D. Schimidt, "Object-Oriented Application Frameworks", Communication of the ACM, Oct., 1997, pp. 32-38.*
DesktopProfile Architecture Overview, Visualware technical paper, no date given, http://www.desktopprofile.com/resources/technical/architecture.html.*
S. Lewandowski, Frameworks for component-based client/server computing, ACM, 1998, pp. 3-27.*

(Continued)

*Primary Examiner*—Sue Lao
(74) *Attorney, Agent, or Firm*—Fliesler Meyer, LLP

(57) ABSTRACT

The invention provides a software component plugin framework. The system described supports dynamic loading, instantiation, and unloading of interface implementations (plugin modules), together with encapsulation of these interface implementations. The many benefits provided by the invention include software reuse, interoperability and fast product development cycles.

46 Claims, 13 Drawing Sheets

OTHER PUBLICATIONS

Jain, P. et al, Dynamically Configuring Communication Services with the Service Configuration Pattern, C++ Report, Jun. 1997. pp. (1-13).

N. Narashimhan, L.E. Moser, P.M. Melliar-Smith, "*Interception in the Aroma System*", Department of Electrical and Computer Engineering, University of California, Santa Barbara, CA, Jun. 2000, pp. 107-115.

Marcello Mariucci, "*Enterprise Application Server Development Environments*", University of Stuttgart, Oct. 10, 2000, pp. 1-29.

N. Narashimhan, L.E. Moser, P.M. Melliar-Smith, "*Using Interceptors to Enhance COBRA*", University of California, Santa Barbara, CA, Jul. 1999, pp. 62-68.

* cited by examiner

SYSTEM AND METHOD FOR SOFTWARE COMPONENT PLUG-IN FRAMEWORK

This application claims priority from provisional application "SYSTEM AND METHOD FOR SOFTWARE COMPONENT PLUG-IN FRAMEWORK", Application Ser. No. 60/294,467, filed May 30, 2001, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to object component models and specifically to a system and a method for enabling plugin applications in a framework architecture.

BACKGROUND OF THE INVENTION

Today's business environment has become increasingly dependent on electronic commerce or "e-commerce" applications for their day to day operations. E-commerce applications typically define such enterprise-wide functions as supply chain management purchasing, sales, finance, manufacturing, enterprise resource planning, and data processing. An e-commerce application is typically designed to operate or run on a dedicated computer server or group of servers known collectively as an e-commerce or transaction server. Such server products include the TUXEDO™ product from BEA Systems, Inc., San Jose, Calif.; Weblogic Server™, also from BEA Systems; Commerce Server™ from Microsoft Corporation in Redmond, Wash.; and both Avila™ and CRM™ from IBM Corporation, Armonk, N.Y.

The key requirements for such servers are that they be proven, reliable, and scalable so as to meet the needs of a growing organization. Some products are also designed with flexibility in mind. Particularly, TUXEDO is geared towards providing a powerful and flexible end-to-end e-commerce solution that can be used to connect and empower all users, while integrating all of a corporations corporate data.

One of the primary disadvantage of such e-commerce or transaction servers is that they tend to be very large applications in and of themselves. The typical e-commerce server ships as a server application that must be compiled to form an engine or kernel through which client applications may then communicate. Once compiled, very little can be added or modified to the server application, and hence to the system, without requiring a reconfiguration of this kernel.

FIG. 1 shows a traditional kernel compilation process as it applies to an e-commerce application. As shown therein, the typical e-commerce server may be originally shipped with little or no "personality". As used herein the term "personality" is used to refer to a particular application front end with which user (client) applications will interact, and include such personalities as AMS, Jolt and TUXEDO. Personalities communicate with the outside world (i.e., the client applications) via a variety of programming concepts that are hereinafter referred to as "attitudes". Attitudes may include for example, Java, C, C++, Cobol, and OLE (Object Linking and Embedding). Similarly the e-commerce server may ship with little or no extensions, add-on applications that are used by the e-commerce server but are not directly programmed as a client application, and in some cases may not even interact with the outside world. Extensions can be considered as useful utility functions that are used to augment the server's standard features.

Traditionally, in order to add personalities or extensions the server kernel must be re-configured and recompiled at each step. This necessitates server downtime and greatly increases the risks that errors will be introduced either during the recompile process or during the attempt to get the server running again in the shortest possible time. As shown in FIG. 1, switching to a TUXEDO personality, adding a connection module extension, and then adding a security module extension, may take as many as three server downtimes and kernel recompiles. Such compile problems are also encountered when adding routine server application updates and software patches. The traditional server architecture likewise does not lend itself to reuse of Module code when the server kernel is itself replaced. Much time and cost is spent re-writing code for new releases of a server product that does much the same as the last version of the code. Customers who develop custom code to run with or within their server product find their code unusable with server releases of the server product. The overall result is one of redundant coding, expense and wasted time.

SUMMARY OF THE INVENTION

To address this issue, the inventors have concluded that it would be advantageous to break the existing application transaction server or e-commerce server into a set of more manageable components. This would also address the following goals:

Allow commerce and transaction server customers to reuse their client applications with newer or future server products.

Eliminate additional steps of porting and recertifying other, related server-based products because of changes to the currently offered server infrastructure.

Address the needs of e-commerce server customers who suffer because their server-based products include bugs that have been corrected in the latest version of the server system.

Reduce the amount of code copied/changed across products through "componentization", and encourage the reuse of software code to minimize redundant coding.

Consequently, to address these goals, the inventors propose an e-commerce server architecture wherein a server engine component, referred to herein as an "engine", plays a center role in providing some basic services, and also a plugin mechanism that allows the customization of the engine. This customization may include well-defined interfaces to the engine, and call-outs from the engine. Personalities are provided through plugin modules, including any customizations to the engine's set of extensions.

Within the server engine, dynamic linking and loading of a plugin module (referred to herein as an interface implementation), and encapsulation of that interface implementation, occurs in such a manner that the interface implementation is totally hidden from the interface user (i.e., the component acting as a client or client application).

As disclosed herein, the invention provides a plugin framework that may be incorporated into, or as part of, an application server engine to allow dynamic customization of the engine interfaces in terms of extending them through plugin modules. These plugin modules are in turn provided by personalities, and engine extensions. Application server engines that may be used with the invention include both e-commerce transaction and application engines. One embodiment of the engine Plugin Framework provides the following features:

A formal plugin module integration model;

A common infrastructure for dynamic loading, linking and unloading of plugin modules;

A common registry mechanism for plugin modules; and

Plugin application programming interfaces (APIs) that act as extensions to the engine provided interfaces Both DLL (Dynamic Link Library) and non-DLL types of containers for plugin modules may be supported through various embodiments of the framework architecture. A system incorporating this new architecture can be visualized as a pool of software components interacting with each other through a client-server relationship. As used herein, a software component is considered a "client" when it asks for a service provided by another component, and is considered a "server" when it provides a service being requested by another component. The set of services offered by a component is accessed through a well defined interface. A component can offer multiple sets of either interrelated or not interrelated (i.e. independent from each other) services through corresponding interfaces. To the client, a component thus appears as a set of interfaces. The client does not care how these interfaces are actually implemented by the component. Components as used in this context of this application are thus the implementation provider for a given set of interfaces they support. A component can be removed from an application and replaced with another component, so long as the new component provides an implementation for the same interface as the old component did.

When implementing such an interface architecture one of the early design decisions regarding the use of components is to decide on the medium or container for making the component available during run-time. There should be a backing implementation for each interface being invoked by a client. This implementation library can be dynamically linkable, if the requirement is for separating the client from the interface implementation, and dynamically loadable if the requirement is to not load the component until it is actually needed. The library may be another process on the same (i.e. local), node or on a remote node.

DETAILED DESCRIPTION

Figure 1:
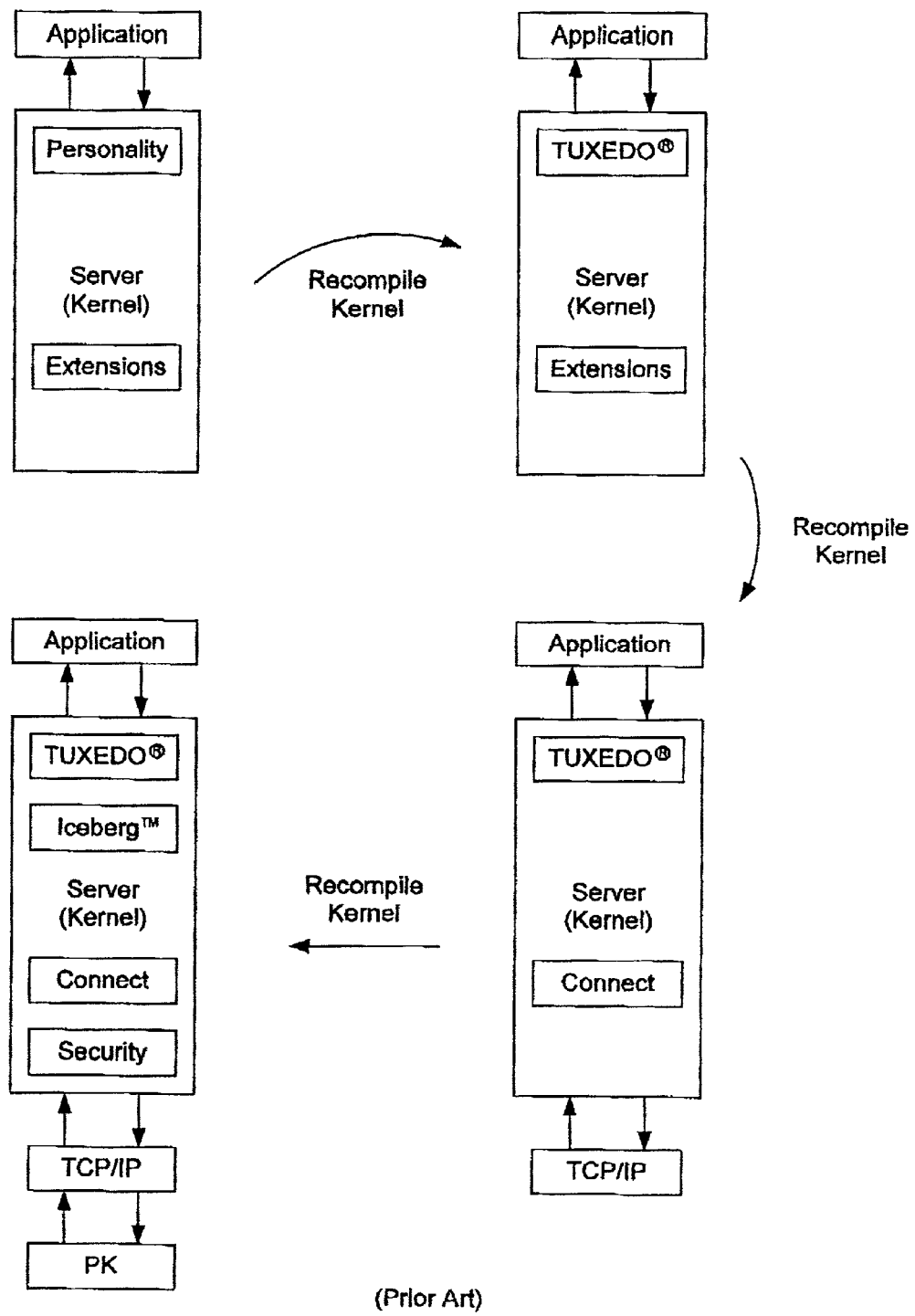
FIG. 1 is an illustration of a prior art server configuration process.

Included below is a brief glossary of terms, acronyms, and abbreviations which will be useful in understanding the detailed description of the embodiments that follows:

Engine—A collection of common, personality independent services (for example, communications, load balancing, routing, basic security, basic mgmt). As used in the context of this application the term "engine" is synonymous with the word Kernel.

Personality—A programming model support (which includes a mapping to the engine and the environment) for example, API mappings and personality-specific functions.

Attitude—A programmatic interface for programming model.

Extension—Specialized services for connecting/interoperating with third party products.

Interface—A contract about a set of services between the requesters (clients) and the providers (servers) of the services. This contract specifies a set of functions with the associated syntactical and semantical properties (for example the input/output parameters, or the return value). Services within an interface are usually though not necessarily related.

Interface ID (Iid)—A unique identifier or ID for an interface specification.

Implementation—A set of software modules implementing the services specified by a particular interface.

Implementation ID (ImplID)—A unique identifier or ID for an implementation of an interface. This ID is unique among all of the registered interface implementations associated with a particular interface.

Interface Realization—The process of instantiating an interface implementation and passing a pointer to it for later reference by the client.

Component—A set of software modules bundled together, and providing implementations for a set of interfaces.

Plugin—An implementation for a particular interface.

Plugin Framework (PIF)—An engine plugin framework component as used by the invention to accept plugins.

Registry—A persistent storage data repository for storing PIF related information.

Dynamic-Link Library (DLL)—A component server, or a container for a component. DLLs typically share the same address space as the client application they are linked to. On some platforms (for example UNIX) the container is a shared object in that its text segment can be loaded once and shared among all the processes using it.

Container—A medium for the distribution of plugins. For example, a DLL may act as a container.

Virtual Function Table (Vtable or Vtbl)—An array of pointers for an interface that point to the various implementations of the functions that make up the associated interface.

pVtbl—A pointer to a Vtable

Derived Implementation (Composite Plugin, Derived Plugin)—An interface implementation that inherits the implementations of some of the methods of the interface from other implementations of that interface (in other words it implements or is associated with other implementations of that interface).

Singleton Plugin—A plugin which can only have a single instance.

Document Convention—Throughout the following sections of this document, the following conventions apply within the examples shown:

[. . . ] indicates an optional item.

<. . . > indicates a token which can be replaced by a real value conforming to the syntax specified. The value between <and > is often replaced with a plugin-specific name to retrieve plugin-specific functions.

Figure 2:
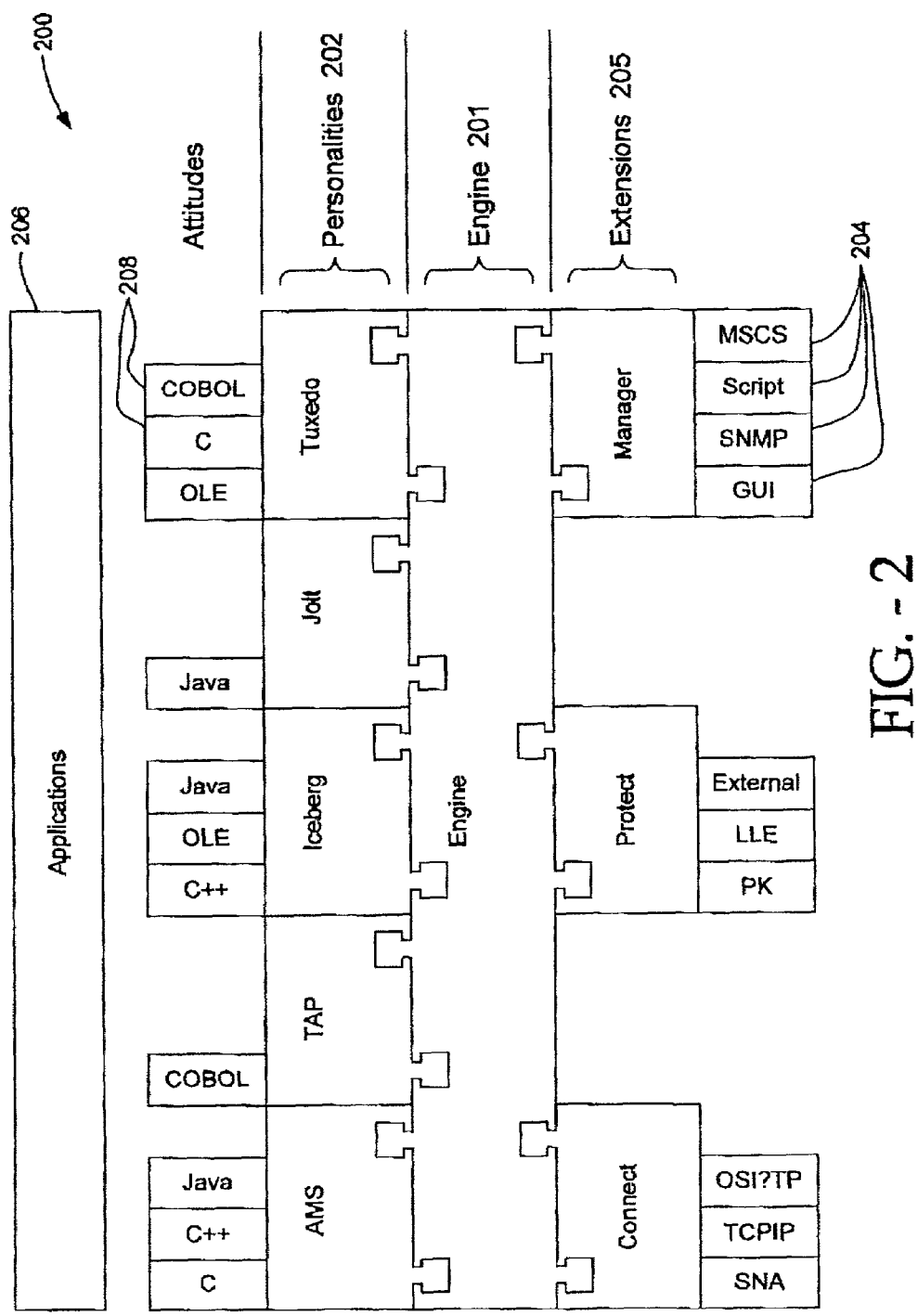
FIG. 2 is a schematic of a framework system architecture in accordance with an embodiment of the invention, illustrating the placement of the engine.

FIG. 2 shows a schematic of a system architecture in accordance with an embodiment of the invention. As shown in FIG. 2, the invention provides a dynamically configurable plugin engine, which in turn is part of a larger plugin framework 200 (hereinafter referred to as a PIF). In one embodiment, the PIF 200 comprises an engine 201, together with various plugin personalities and plugin extensions. These framework components allow a client application to access services in a manner that is transparent to the application invoking the service. Personalities 202 that can be used with the invention include such systems as TUXEDO, Jolt and AMS. These personalities allow a client application 206 to interact with the engine via a set of programming languages or attitudes 208. Attitudes include, for example, the C, OLE and Cobol attitudes offered by the TUXEDO personality. The personalities are plugged-in to the engine as a series of components, as are the services needed by the clients. Specialized plugins, often referred to as extensions 204, may similarly be plugged in to the framework, for example to act as managers or interfaces to a family or group of specialized services 205.

As shown, the PIF enables the implementation and support of a component model architecture in which:

A component is a set of software modules that are bundled together, and which provide implementations for a set of services specified by the corresponding interfaces.

An interface is a contract about a set of services between the requesters (clients) and the providers (servers) of the services. This contract specifies a set of functions with the associated syntactical and semantical properties, for example the input/output parameters and the return values, etc. Components utilize a client/server relationship, and communicate with each other through interfaces.

Figure 3:
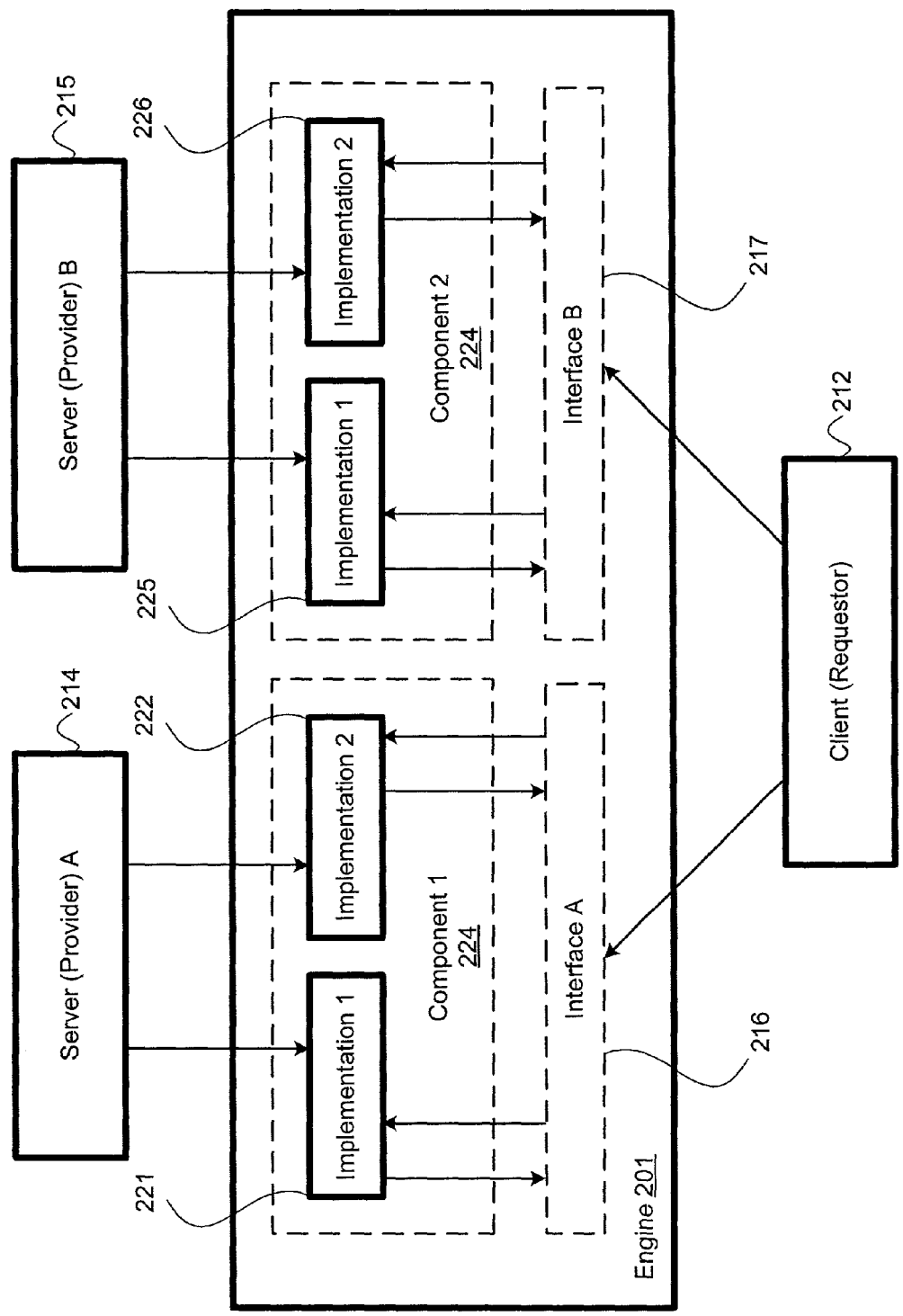
FIG. 3 is a schematic of a component interface in accordance with an embodiment of the invention.

With this architecture, the engine 201 can be further visualized as shown in FIG. 3 as a pool of software components interacting with each other through a client-server relationship. A component 212 is considered a client when it invokes a service 220, 224 provided by another component, and a server 214, 215 when it provides a service being invoked by another component. The set of services offered by each server component can be accessed through a well-defined interface 216, 217. A server component can offer multiple sets of services through the corresponding interfaces which may be interrelated or not interrelated (independent from each other).

An interface is a binding point between a client component and the server component. The client component need not know how these interfaces are implemented by a server component. In other words, the server component backing the interface is totally transparent to the client component. This means that an implementation 221, 222 (a plugin) of an interface 216 can be replaced by other plugins at run-time, without impacting the client application code.

To a client, an interface may for example be a C language data type structure of which every member is a function pointer pointing to the plugin functions implementing the services defined by the corresponding interface. An interface is thus only a formal specification of a set of services until it (and its corresponding implementations or plugins) is registered and subsequently realized. As such, an interface has to be realized before its services can be invoked. The interface realization process consists of locating the specified implementation, loading it into the caller's address space, and populating an internal table of pointers with the addresses of the plugin functions implementing the services defined by the corresponding interface.

Interface Definition

One method of defining an interface is to use a standard specification such as the Object Management Group's (hereinafter referred to as OMG) Interface Definition Language (hereinafter referred to as IDL), or a subset of it. However, one can alternatively use any language which supports a "structure", "record", or an equivalent type of data structure with double-indirection support, (e.g. the struct command used in C or C++). The method of actually defining an interface is not necessary for an understanding of the present invention and can be left to the interface developer.

The interface developer is however expected to provide the following software modules which are then linked by the clients and/or the plugins of that interface prior to run-time:

Header Files: Both the client applications and the plugins use header files to define interfaces, function prototypes of the interface functions, and the macros for the invocations of various interface functions. These header files are included into the client application and the plugin's source code.

Client stub files: The client application uses client stub files for invoking the interface functions. A client stub defines an interface as a set of language-specific data types and routines, one for each function (method) that is part of the interface. These client stubs are compiled and linked into the client application.

Plugin skeleton files: A plugin uses the plugin skeleton files to map client invocations of interface functions to the actual function implementations in the interface implementation (i.e. the plugin).

Interface Identity

In one embodiment of the invention, every interface has a name that serves as the compile-time type in the code that uses that interface. These programmatic types are defined in header files provided by the interface developer.

The programmatic name for an interface is only a compile-time type used within the application source code. Each interface also has a unique run-time identifier <interface id>, with the following syntax:

<interface id>:=<component name>[/<sub-component name>]/<interface name> wherein:

<component name>:=<an alphabetic character or '_' character><string of alpha-numeric characters & '_' character>;

<sub_component name>:=<string of alpha-numeric characters & '_'>; and,

<interface name>:=<string of alpha-numeric characters & '_'>.

It will be evident to one skilled in the art that the particular variable names and syntaxes given here are for exemplary purposes, and that the invention is not limited to the specific syntax described herein.

In accordance with one embodiment, there is one universal namespace for recording <interface id>s in the engine PIF. Each <interface id> is unique within this namespace. In addition to <interface id>, every interface may also have a version associated with it, specified as two numbers, a <major version number> and a <minor version number>. The combination of an <interfaceid> together with a version uniquely identifies a particular version of an interface.

Versions are used to indicate compatibility among interfaces, and particularly between releases of the same interface. A <major version number> change implies a different interface. Different major versions of an interface are not expected to be compatible with respect to each other. However, the same <major version number>s, but different <minor version number>s of an interface should be compatible in the sense that a version with higher <minor version number> should be downward compatible with the version with lower <minor version number>. Both the <major version number> and the <minor version number> can be given by a numeric string representing a number between 0 and 256.

Each engine's personality and extension has a unique <component name>. An <interface name> should be unique within a component which owns it. The component provider (who may be a third-party vendor or developer) is responsible for assigning <interface name>s, <major version number>s and <minor version number>s to the interfaces which they provide.

Implementation Identity

In accordance with an embodiment of the invention every implementation of a supported interface has a unique implementation ID (implid) with respect to the interface it is implementing. This implementation ID has the following syntax:

<impl id>:=<component name>[/<sub-component name>]/<impl name> wherein:

<component name>:=<an alphabetic character or '_' character><string of alpha-numeric characters & '_'>;

<sub_component name>:=<string of alpha-numeric characters & '_'>;

<impl name>:=<string of alpha-numeric characters & '_'>; and,

<component name> is the assigned vendor name from a set of reserved vendor IDs.

There is one universal namespace for recording <impl id>s in the engine PIF. Each <impl id> is unique within this namespace.

Version Control

Interface version compatibility is an important issue between an interface requested or invoked by a particular caller, and the interface implementation or plugin which backs or realizes the interface. In accordance with one embodiment of the invention, every interface has a version number that can be specified in terms of major and minor version numbers. A plugin is an implementation of a specific version of an interface. The following rules apply with regard to version compatibility between the interface being realized and the plugin being considered to back the interface during the realization process (the processing of _e_pif_realize( ) function):

Each plugin has a run-time knowledge of the version of the interface for which it is providing an implementation. If the major version number of the interface which the caller is attempting to realize and the major version number of the interface which the specified plugin implements are different, then the interface and the plugin are not compatible and in this case the realization of the interface fails.

If the major version number of the interface the caller is attempting to realize, and the major version number of the interface which the plugin specified implements are the same, then the following subset of rules apply:

An interface with a higher minor version number is downward compatible (in terms of functionality, and function signatures) with interfaces with lower minor version number and identical <interface id>.

An interface with a lower minor version number and identical <interface id> is a subset of an interface with a higher minor version number.

During the realization process, the backing plugin (i.e., the one which is realizing the interface) must have a minor version number which is equal or higher than the minor version number of the interface being realized. Otherwise, the interface and the plugin are not compatible.

The Vtbl returned by a plugin implementing an interface with a higher minor version number is allowed to grow only in a downward compatible way in terms of both size and content with the Vtbl of a plugin implementing the same interface, but with a lower minor version number. The term Vtbl used herein takes its common meaning and is a term known to one skilled in the art.

The rules described above are given to illustrate a particular embodiment of the invention and particularly version numbers used within that embodiment. It will be evident to one skilled in the art that other rules can be substituted for or added to those shown above while remaining within the spirit and scope of the invention.

Plugin Profiles

PIF profiles provide a way of associating a PIF client (the caller of a PIF external interface function, whether it is an application process or a system process) with a set of PIF related attributes during run-time. A PIF client may want to use its own implementation for a specific interface or it may want to realize a different implementation.

PIF profiles are identified by unique profile identifiers called <profile id>s. The syntax of a <profile id> is specified below.

<profile id>:=<a character string consists of alpha numeric characters and _ character>.

There is one universal namespace for <profile id>s in the engine PIF. Each <profile id> is unique in this namespace. The PIF can be configured to always search the profile <profile id> specified by an EV_PIF_PROFILE environment variable in <interface id> or <impl id>, before it searches for the default system-wide profile. A group of clients may be associated with the same profile and consequently refer to the same set of interface/implementation object attributes. A PIF client maybe associated with an existing PIF profile by setting the EV_PIF_PROFILE environment variable to the desired <profile id>.

PIF Registry

The PIF needs to locate the necessary plugin container, which can be a DLL (which contains the specified plugin), in order to load it into the registry Therefore it needs to know its image path and also other attributes about the interfaces and the interface implementations it is dealing with. To accomplish this, an embodiment of the invention uses a persistent storage based data repository for storing this kind of information. The PIF does not require a particular structuring for the persistent storage based plugin related information. Instead, the PIF describes this plugin information and specifies a set of command utilities for registering and unregistering plugins and for querying and/or updating the stored plugin information. Within this document, the data repository that is used for storing PIF related information is referred to as the "registry". In the registry, interfaces and interface implementations are identified by <interface id>s and <impl id>s, respectively.

Both the interface, and the implementations backing it, have an associated set of attributes. In addition, an implementation is always associated with the interface it implements. Given a particular interface, there may be multiple implementations for that interface. An interface identifier <interface id> is an attribute of an interface implementation, identifying the interface this particular interface implementation implements. An implementation identifier <impl id> is an attribute of an interface it is associated with the implementation.

In object-oriented terminology, the registry may be considered a persistent store for PIF related objects and their associated attributes. These PIF related objects and their attributes are described in table 1, table 2 and table 3. Table 1 lists some interface objects, table 2 implementation objects, and table 3 profile objects. It will be evident to one skilled in the art that other objects can be stored within the registry to supplement or replace those shown, while remaining within the spirit and scope of the invention.

TABLE 1

Interface Object

| Attribute | Value of Attribute | Description |
|---|---|---|
| Interface Id | <interface id> | Interface id of an interface specification |
| Major Version Number | <major version number> | Major version number of the interface. |
| Minor Version Number | <minor version number> | Minor version number of the interface. |
| Selector | <selector> | A string of alpha numeric characters & '_'. It is unique among the <selector>s associated with an interface object. Multiple <selector>s can be defined for an interface object. |
| <selector> | <impl id> | Used for aliasing a plugin implementing the associated interface object. A <selector> is independent of the version of the interface. |
| Default Impl | <impl id> | Implementation id of the default interface implementation, per major version of an interface object. |

TABLE 2

Implementation Object

| Attribute | Value of Attribute | Description |
|---|---|---|
| ImplId | <impl id> | Implementation id of an interface implementation. |
| Image Path | <Container path name> | Path name of the container or DLL containing the associated interface implementation. |
| Entry Func | <_ec_pif_instantiate> | Name of instantiation function of the interface implementation object. |
| Impl Major Version | <major version number> | Major version number of the implementation object that is different than the major version number of an interface object. |
| Impl Minor Version | <minor version number> | Minor version number of the implementation object that is different than the minor version number of an interface object. |
| Params | <string> | A string of characters to be passed to implementation object's instantiation function if defined. Multiple Params attribute can be defined for an implementation object. |
| Inherits From | <impl id> | <impl id> of the interface implementation this implementation inherits from. |
| Interception Type | STACK or Fanout | This attribute specifies the type of interceptor sequence specified with the corresponding InterceptionSequence attribute of the implementation object. |
| Interception Seq | <impl id>, . . . , <impl id> | Ordered sequence of implementation ids of the interface implementations whose methods are invoked in the specified order (left-to-right). The interface implementations specified are all associated with the same interface. |

TABLE 3

Profile Object

| Attribute | Value of Attribute | Description |
|---|---|---|
| Profile Id | <profile id> | A unique (within the registry) profile id |
| | A set of Interface Objects | |
| | A set of Implementation Objects | |

Plugin Registration

Before an interface implementation can be used (i.e., before it can be realized), it must be installed in the system and registered within the registry. Unregistration and/or uninstallation of the interface implementation is required to later remove all the relevant information from the registry. To accomplish these tasks, the PIF provides the following command utilities:

epifreg ( ) for registering a plugin.

epifunreg ( ) for unregistering a plugin.

epifregedt ( ) for editing registry based PIF related information.

The functions epifreg, epifunreg, epifregedt and the other functions described below, are given these function names for purposes of illustration. It will be evident to one skilled in the art that the invention is not limited to using the specific functions described herein.

Dynamically Loadable Library (DLL)

In one embodiment of the invention a dynamically loadable library (DLL) is used as the component server or container. Implementations of the interfaces (plugins) are contained inside DLLs. In accordance with one embodiment a DLL may contain only one plugin although their embodiments may support multiple plugin DLL's . A plugin may not span over multiple DLLs. A DLL may contain multiple plugins which may or may not be for the same interface. A DLL may contain a derived plugin, which implements only a subset of the functions which make up the corresponding interface, and which inherits the implementation of the remaining functions of the interface from another plugin.

The PIF provides the following functions or services for loading and unloading a DLL to and from the caller's address space, and for getting the address of a function in a loaded DLL:

_e_dl_load is used for loading an executable module into the address space of the calling process.

_e_dl_unload is used for unloading a dynamically loadable library (DLL) module from the calling process' address space. This function also decrements a reference count associated with the specified library.

_e_dl_getfuncaddr is used for getting the address of an exported dynamically loadable library (DLL) function given a function name.

_e_dl_addref is used for incrementing the reference count associated with a DLL.

These functions can be provided as a library tailored to each desired or supported personality. For example, for use with TUXEDO, the functions may be provided through a TUXEDO standard libgp library.

Plugin Framework External Interfaces

The PIF external interface comprises the following functions:

_e_pif_realize( ) for realizing an interface and instantiating a plugin.

_e_pif_dupref( ) for incrementing the reference count associated with an instance of a plugin (which can be used for lifetime control), or for duplicating a plugin instance.

_e_pif_release( ) for decrementing the reference count associated with an instance of a plugin used for lifetime control.

_e_pif_getinfo( ) for getting information about a plugin.

_e_pif_iscompatible( ) for version compatibility checking.

_e_pif_interception_seq( ) for getting the ordered sequence of interface pointers of the plugin instances in the fanout type interception sequence.

_e_pif_this( ) for getting the address of the private data.

Realization of An Interface

Figure 4:
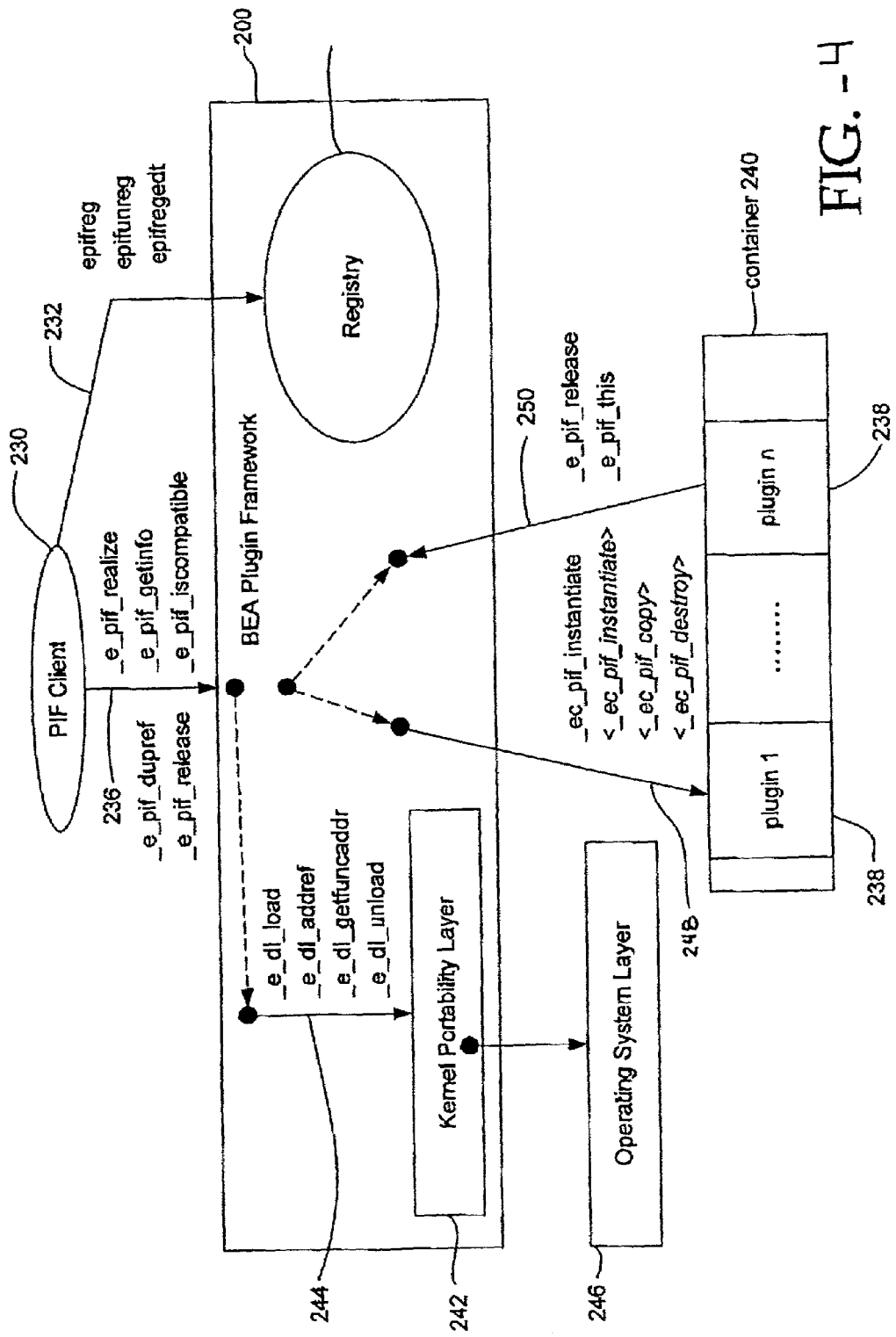
FIG. 4 is a schematic of the engine plugin framework in accordance with an embodiment of the invention.

FIG. 4 illustrates the flow of function invocation sequences during the interface realization process. Until it is realized, an interface is merely a specification of a set of function signatures with the associated behavioral semantics. In one embodiment, a number of implementations 238 can be stored in a container 240. In this example, a DLL file is used although other types of containers can serve this function. A client application 230 is used to register (and later to optionally unregister) these implementations within a framework registry 234. The registration process is accomplished by a series of routines epifreg, epifunreg, and epifregedt, described above. The names given herein for routines or functions are illustrative and are not required in all embodiments of the invention, but instead may be substituted or replaced with equivalent mechanisms and routines.

Following the registration process, the registry thus contains a list of all current implementations. When a client application makes a request to use an implementation they must realize the interface. This is performed through an _e_pif_realize routine. Other routines, such as _e_pif_getinfo allow the client application to get additional information about the interface. A call to realize the interface is passed to a kernel portability layer 242. The kernel portability layer allows the PIF 200 itself to be independent of the operating system layer 246. The PIF translates the realize request from the client into a series of function requests 244 to the kernel portability layer to load the appropriate implementation container. The PIF also issues requests 248 to the appropriate container to instantiate a particular implementation (and later passes requests 250 to release that implementation).

For an interface to be useful, an interface has to have a language binding, an implementation, and a well defined set of rules for interaction between the client and the implementation of the interface. This set of rules comprises the "interface realization protocol." The interface realization protocol encompasses rules governing client invocation, virtual function tables, plugin instantiation and reference counting. In accordance with an embodiment of the invention, the client of any particular interface must have a handle (pointer) to a newly created instantiation of a plugin backing the interface before it can invoke any of the functions of the interface. It acquires this handle for the interface by invoking the _e_pif_realize function, an example of which is shown in listing 1(TM32U is used to refer to an unsigned integer variable, other variable types can be used):

Listing 1

```
_e_pif_realize ( IN   _TCADEF,
IN     const char *pIId,         /* pointer to interface id */    I
       const char *pImplId,      /* pointer to implementation id */
IN     const struct _e_pif_iversion *version, /* interface version */
IN     const void *data, /* data passed to plugin from caller */
IN     long datalen,             /* size of buffer data points to */
OUT    void **pI, /* interface pointer */
IN     TM32U           flags       /* flags */
)
```

The pointer to the implementation id (implementation id pointer), hereinafter referred to as pImplId can be specified as either an <impl id> or a <selector>, or NULL. If pImplId is specified as NULL, then the <impl id> of the default implementation defined in the registry database (Default-impl attribute) is used instead. This default implementation is searched according to the search rules associated with the registry database, such as, for example, the first client's (caller's) profile and then the system-wide profile for the interface ids.

Figure 5:
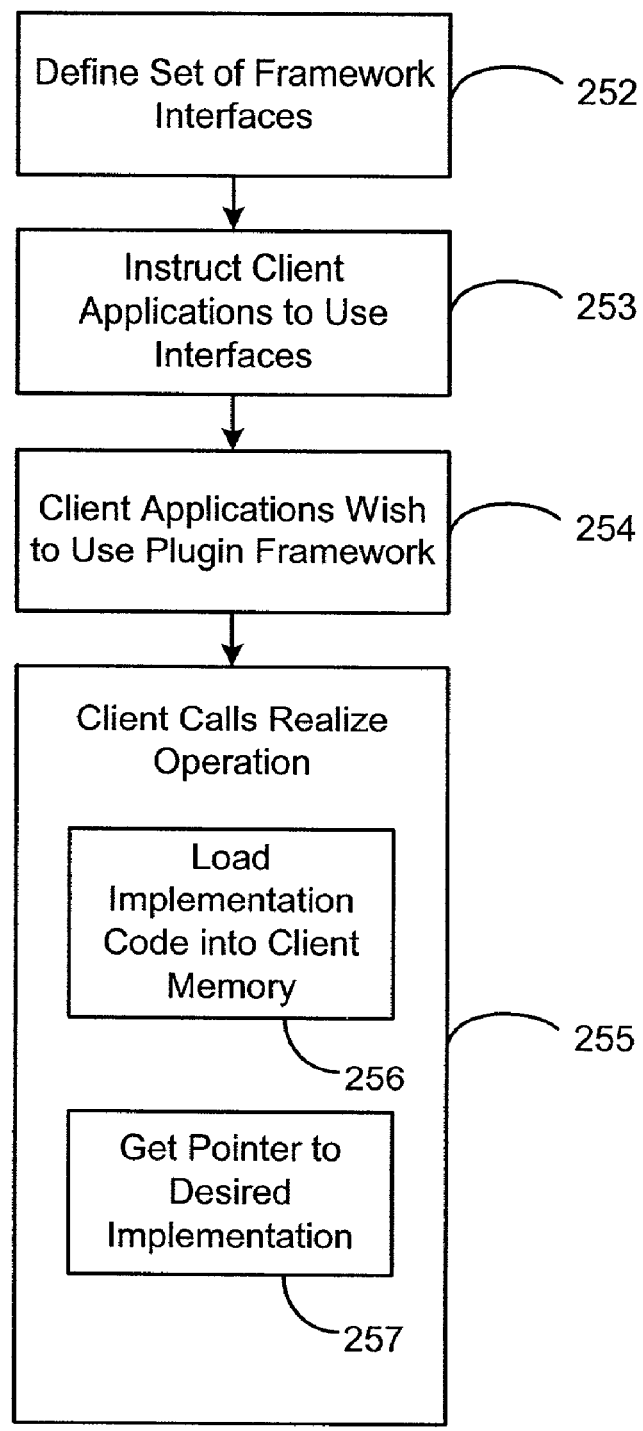
FIG. 5 is a flowchart of a realization of an interface in accordance with an embodiment of the invention.

FIG. 5 shows a flowchart of a method used to read an implementation into a client's memory space. As shown in FIG. 5, in step 252 a set of framework interfaces is defined. In step 253 the client application is developed or otherwise instructed to use a particular interface defined within the framework. In step 254 the client application makes a request to actually use the interface within the plugin framework (PIF). A call is made to realize the interface (step 255). This results in the client receiving a pointer to the desired implementation (step 256), which it then uses in step 257 to locate the implementation, and to retrieve the implementation into local memory.

Figure 6:
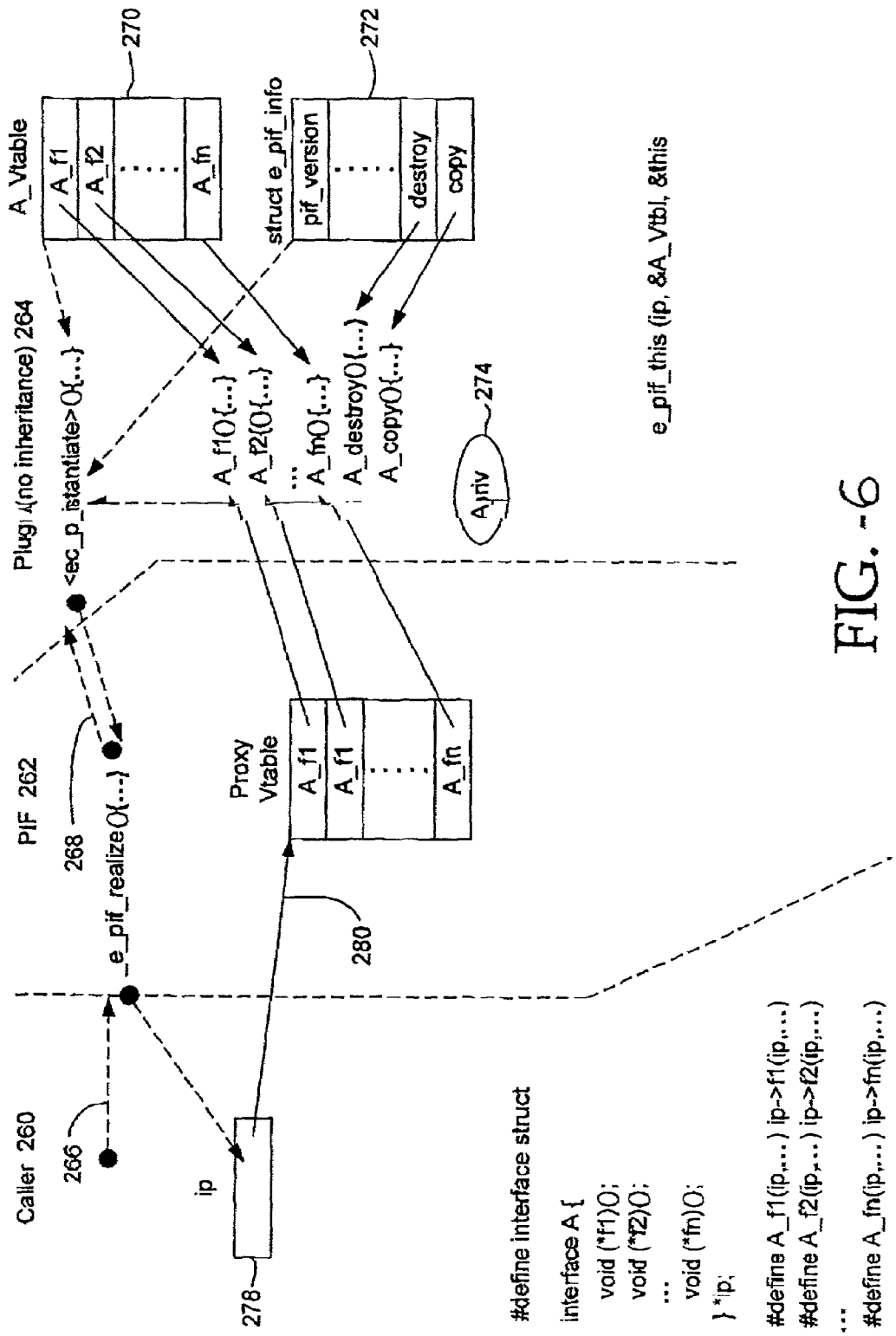
FIG. 6 is a schematic of a plugin realization in accordance with an embodiment of the invention.

The interface realization in this example involves only a single implementation (with no inheritance) and is further described in FIG. 6. In FIG. 6, a calling application (caller) 260 uses the PIF 262 to realize an implementation plugin A 264. The dashed lines in the Figure indicate the invocation sequence and the handles returned to various components during the realization of an interface. The solid lines in FIG. 6 indicate the relationships among the data structures involved in interface realization. The caller 260 issues a request 266 to the PIF 262 to realize an interface. The PIF uses this request information and the information stored in the registry to send an instantiate request 268 to a plugin A 264. The PIF uses the information stored within the plugins Vtbl 270, private data store 274, and per-instance data structure 272, to create a proxy Vtbl 276. A pointer 278 to the proxy Vtbl is then returned to the caller. The caller uses this pointer to thereafter communicate 280 with the interface and the implementation. Each of these processes is described in further detail below.

As shown in FIG. 6, the handle returned (ip) is a pointer to a data structure in memory, called a Proxy Virtual Function Table (Proxy Vtbl). In one embodiment, the Virtual Function Table (Vtbl) is a C struct of function pointers pointing to the actual functions comprising the implementation for the interface being realized. Every plugin is required to maintain (e.g. allocating a memory block and populating it) its own Vtbl. Plugins are also responsible for managing per instance private data and plugin-wide struct _e_pif_plugin_info data structure. The PIF is responsible for presenting to a client a realized interface as a C struct, of which the members are pointers to functions implementing the function signatures which the interface specifies.

As part of interface realization process, the PIF loads the container or DLL containing the target plugin for backing the interface, and then invokes <_ec_pif_instantiate>( ) function of the plugin, if it is available and registered. Otherwise, it invokes a DLL-wide _ec_pif_instantiate( ) function to instantiate an instance of the plugin. Both _ec_pif_instantiate( ) and <_ec pif_instantiate>( ) functions have the same function signature. Given a pointer to an <interface id> and a pointer to an <impl id>, they instantiate a plugin and return three handles: the address of the plugin's Vtbl; the address of the plugin instance specific private data; and the address of the plugin's _e_pif_plugin_info structure.

The _e_pif_plugin_info structure contains information relevant to the implementation of the interface. In particular, an EF_PIF_SINGLETON flag indicates to the PIF that the implementation is a "singleton". When a singleton implementation is instantiated, new calls to instantiate the implementation result in a reference to the first plugin instance. The PIF may use this singleton indication to optimize reference handling for other _e_pif_realize( ) calls to this implementation (since the PIF is not required to call the _ec_pif_instantiate( ) function). If a particular implementation turns off this indication, then the PIF will always call the _ec_pif_instantiate( ) function every time the client realizes the implementation. Realization of a non-singleton plugin always results in a new plugin instance.

Plugin Lifetimes

The term Interface Lifetime Control is used herein to refer to the mechanism and the set of rules which are used to determine when to unload the container or DLL which contains the implementations of the interfaces that are currently in use. One of the goals of the invention is to make the caller or client immune to replacement of an interface's current implementation by another implementation. To the client, a component is the interfaces it supports. In most cases, the client does not know anything about the actual implementation of the interface provided by the component. Thus, the client can not directly control the lifetime of a DLL since different parts of a program may refer to different interfaces and/or multiple instantiations of the same interface supported by the DLL. In practice, a client will not want to unload the DLL when it is finished with one interface, but still using another interface. Determining when to release a DLL gets increasingly complicated with an increase in the complexity of the client application program. The PIF can be used to manage this lifecycle.

To accomplish this, the PIF provides two functions, namely, _e_pif_dupref( ) and _e_pif_release( ) which can be invoked by PIF's clients for plugin lifetime control purposes. The PIF maintains a reference count for each plugin instance. When a client gets an interface pointer, the corresponding reference count is incremented by calling the _e_pif_dupref( ) function of the interface. When the client is finished using an interface, the reference count is decremented by calling the _e_pif_release( ) function of the interface. When all the reference counts of all the interfaces supported by a DLL falls to 0, the DLL is unloaded from memory.

In addition to these two functions provided by the PIF, plugins may provide an implementation of the _ec_pif_destroy( ) function. The PIF invokes this function when the reference count for a plugin falls to 0. Effective use of a reference counting scheme imposes some rules on the parties involved, which are as follows:

1. Functions that return interface pointers should always call _e_pif_dupref( ) with the interface pointer before returning the interface pointer.
2. When the client is finished with an interface (such as not using the interface pointer anymore), it should call _e_pif_release( ) with that interface.
3. Functions should call _e_pif_dupref( ) whenever an interface pointer is assigned to another interface pointer.
4. Interface pointers with nested lifetimes (e.g. the lifetime of one interface pointer is contained within the lifetime of another interface pointer) do not need to be reference counted. However, interface pointers with overlapped lifetimes, must both be reference counted.

5. Any function that returns a new interface pointer in a function parameter set by the callee should call _e_pif_dupref( ) with the new interface pointer.
6. An interface pointer passed into a function in a function parameter that may possess value to a function does not require an _e_pif_dupref( ) and _e_pif_release( ) because the function is already nested inside the lifetime of the caller.
7. Local copies of interface pointers that are known to exist only for the lifetime of a function do not require _e_pif_dupref( ) and _e_pif_release( ) pairs.
8. If an interface pointer is stored in a global or member variable, the client should call _e_pif_dupref( ) with the interface pointer before passing it to another function.
9. Whenever in doubt, _e_pif_dupref( )and _e_pif_release( ) pairs should be added.

Every implementation of an interface should provide the _ec_pif_copy( ) function in support of the PIF's _e_pif_dupref( ) function. In one embodiment when the _e_pif_dupref( ) function is called with a EF_PIF_DEEP_COPY flag and the plugin is not a singleton, the PIF calls the plugin's _ec_pif_copy( ) function to obtain a copy of the private data of the plugin instance. Then, the PIF creates a new instance of the implementation.

Each plugin container (DLL) also provides a _ec_pif_instantiate( ) for instantiating a plugin which the container contains. This function is invoked by the PIF during realization of an interface if the selected plugin does not provide its own <_ec_pif_instantiate>( ) function and does not set the value of its registry attribute EntryFunc to the name of its <_ec_pif_instantiate>( ) function.

When calling member functions, the caller must include the interface pointer to the plugin instance (which is returned from the corresponding _e_pif_realize( ) function) as the first parameter. In accordance with an embodiment of the invention every plugin of a defined interface is required to obey the following rules:

1. It should maintain a static Vtbl populated by the addresses of its functions implementing the function signatures of the interface the plugin implements. The address of this Vtbl is the address returned by the corresponding _ec_pif_instantiate( ) function or plugin specific <_ec_pif_instantiate>( ) function and will be the address passed to _e_pif_this( ) function as the second argument.
2. It should provide implementations for the following functions:
   _ec_pif_destroy( ) to destroy the plugin instance.
   _ec_pif_copy( ) to create a duplicate copy of a specified plugin instance.
3. It should maintain a static memory block populated with the plugin specific information.
4. It may optionally provide a function which is invoked by the PIF to instantiate it. The EntryFunc attribute of a plugin is set to the name of this function. The function signature of this function is identical to that of _ec_pif_instantiate( ) except for the name.
5. Plugin functions implementing corresponding interface functions should receive an interface pointer as their first parameter.
6. Plugins are responsible to manage their private data where applicable.
7. All the functions of a plugin invoked in the context of a plugin instance may access the same private data area, which is per-instance of a plugin and is not per-function of a plugin, or per-function of a plugin instance.
8. Plugins using private data may access their private data by invoking _e_pif_this( ) function.

Implementation Inheritance

The PIF allows one interface implementation to inherit the implementation of a subset of interface methods or functions from another interface implementation within the same interface. This inheritance relationship between any two interface implementations of the same interface is specified with an InheritsFrom attribute. The InheritsFrom attribute is an attribute of the plugin which is inheriting and the value of this attribute identifies the interface implementation inherited from. This attribute takes an <impl id> as its value.

The PIF may support single or multiple inheritance. With single inheritance the implementation that is inherited from may in turn inherit from another interface implementation by setting its InheritsFrom attribute to the <impl id> of the plugin it is inheriting from.

Figure 7:
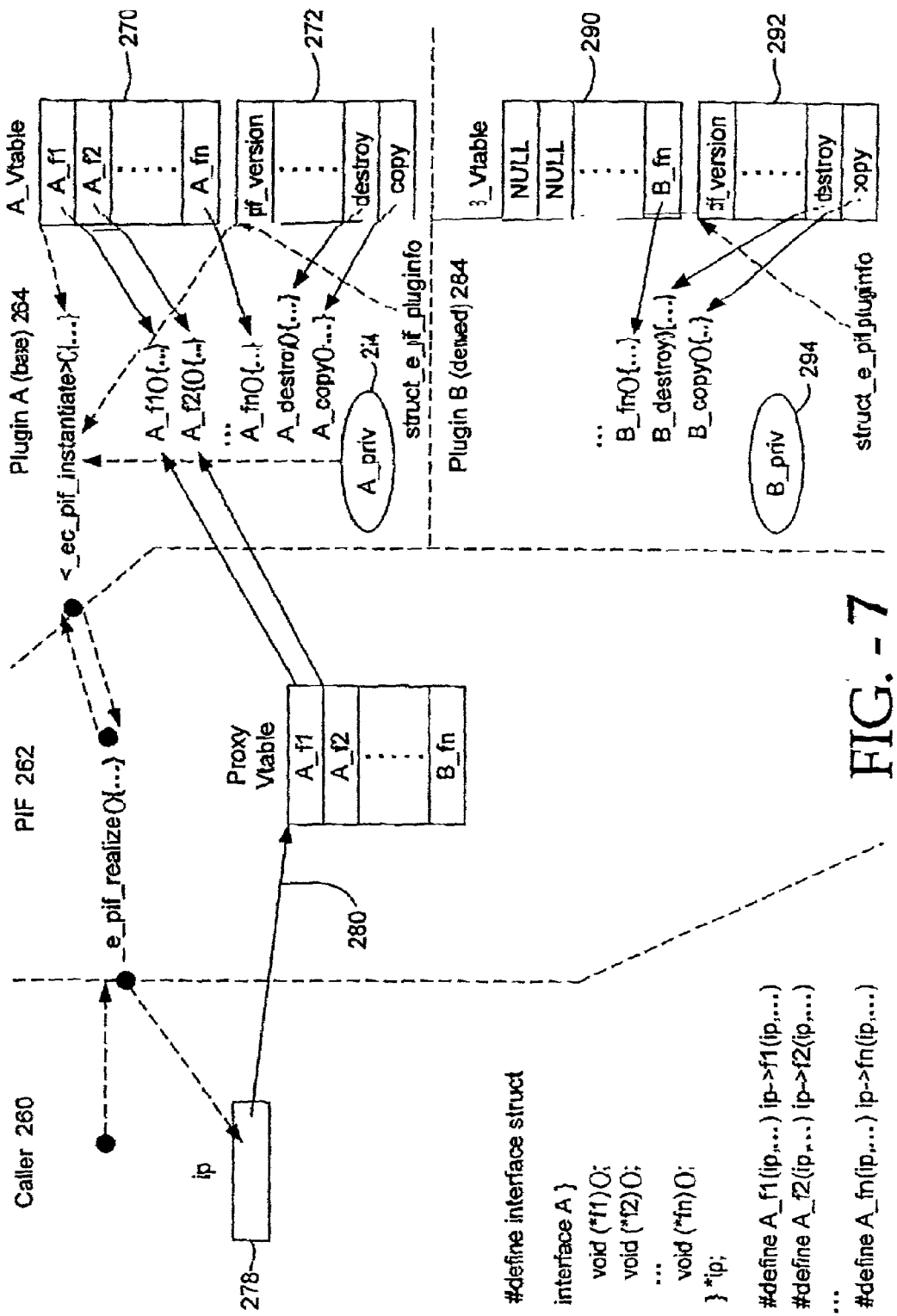
FIG. 7 is a schematic of a derived plugin or implementation inheritance in accordance with an embodiment of the invention.

The memory layout of the interface realization through implementation inheritance is described in FIG. 7. As shown in FIG. 7, dashed lines indicate the invocation sequence and the handles returned to various components during the realization of an interface; solid lines indicate the relationships among the data structures involved in interface realization. As before, a calling client 260 issues a request 266 to the PIF 262 to realize an interface. The PIF uses the information in the request and in the registry to send an instantiate request 268 to plugin A 264. Information from plugin A's vtable 270, private data store 274, and per-instance data structure 272 is used to populate part of the proxy vtable 276. This allows plugin A to fulfill a subset of the interface functions. The remaining interface functions are provided by a derived plugin B 284. Derived plugin B provides information from its Vtbl 290, private data store 294, and per-instance data structure 292, to populate the remaining functions in the proxy Vtbl. The caller then uses a pointer 278, as before, to communicate with the interface and the backing implementation via the proxy vtable. The following rules apply to the interface realization process:

All of the plugins involved in the implementation inheritance or in the inheritance sequence should have a major version number that is equal to that of the interface being realized.

At least one of the plugins involved in the implementation inheritance should have a minor version number that is equal to or higher than, that of the interface being realized.

The minor version number of the derived plugin (the final output of implementation inheritance process) is that of the plugin with the highest minor version number among all the plugins involved in the implementation inheritance process.

If any of the above rules are violated during the inheritance process, then the interface realization process may fail and an EE_PIF_VERSION_MISMATCH error value returned to the caller of _e_pif_realize( ).

The Proxy Vtbl should not have NULL or invalid address valued entries.

The specific rules described above are give for purposes of illustrating a specific embodiment of the invention, and to demonstrate the flexibility of the PIF system. These rules need not be implemented in whole or in part in order to operate the invention, and other rules may be substituted for those described above, while remaining within the spirit and scope of the invention.

The PIF may also support interface inheritance the process of which operates similarly to that shown for plugin inheritance.

Interceptors

Interceptors provide a flexible means of adding services to a system. They allow the binding between the client and the target objects to be extended and specialized to reflect the mutual requirements of both. Interceptors can be logically thought of as being interposed in the invocation and response code paths between the client application making a request and the implementation of the object on which the request is made. As such, interceptors are the functions or methods of the configured interface implementations or plugins which provide the services being interposed.

In one embodiment of the invention the engine supports two types of interceptors: Fanout type interceptors and Stack type interceptors. Interceptors are specified with a pair of attributes, namely, Interception Type and Interception Seq.. These attributes are associated with an interface implementation <impl id>. The InterceptionType attribute specifies the type of interception (either Fanout or STACK) while the InterceptionSeq attribute defines an interception sequence.

An InterceptionSeq attribute specifies the intercepting plugins and their interception order. In one embodiment its value is a comma separated ordered set of <impl id>s, describing the order of the plugins whose methods are invoked in the order specified when the functions of the corresponding interface are called. Wherever a verb of the interface is referred to in a code path, the corresponding functions of the interface implementations specified in the data field of InterceptionSeq value are invoked in the order specified.

Fanout Type Interceptors

Figure 8:
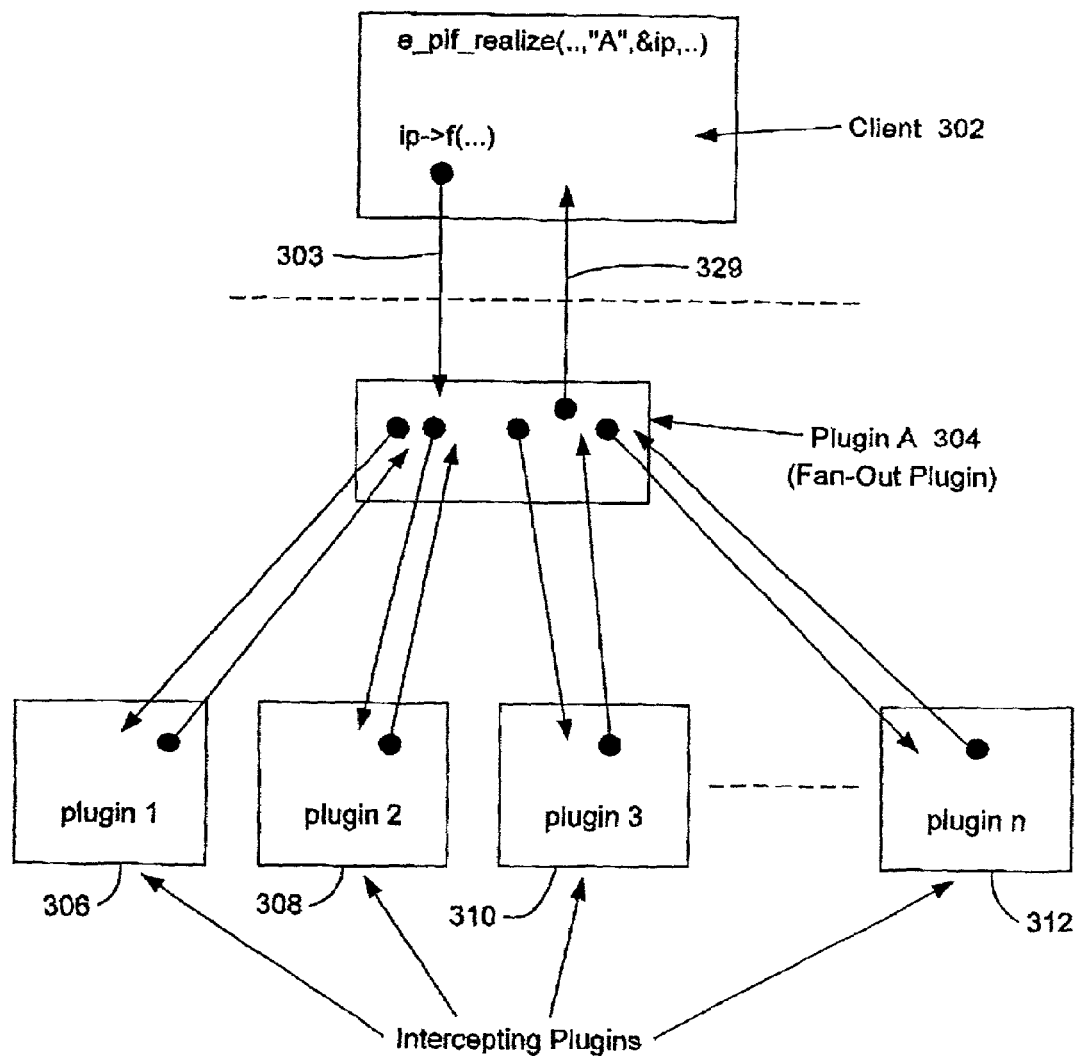
FIG. 8 is a schematic of a fanout type interception in accordance with an embodiment of the invention.

Fanout type interception is illustrated in FIG. 8. As depicted in FIG. 8, Fanout type interception can be implemented totally independently from the PIF. The PIF does not need to be aware of its existence and as far as the PIF is concerned, the interception sequence is no more than a group of plugins comprising the interception sequence specified with the InterceptionSeq attribute. In this approach however, the Fanout plugin needs to know how to access the registry to get the value of the corresponding InterceptionSeq attribute. This can be accomplished by exposing the registry application programming interface (API) or by using the PIF's help to support access by the Fanout type interceptors.

In one embodiment the PIF may provide the necessary support with __ec__pif__instantiate( ) and __e__pif__interception__seq( ) functions. Referring again to FIG. 8, in this model of interception, the calling client or caller 302 invokes the methods of plugin A 304, but is not aware of the intercepting plugins 306, 308, 310, 312. During the instantiation of plugin A, the intercepting plugins as specified by the InterceptionSeq attribute of plugin A are also instantiated by the PIF and the sequence of ordered addresses of these instances of the intercepting plugins is passed to plugin A via __ec__pif__instantiate( ). Subsequent method invocations by the client or interface caller results in invocation of the corresponding methods of intercepting plugins in the order specified by the InterceptionSeq attribute.

The key characteristics of this interception model can be specified as follows:

Given that client invokes method X of plugin A (denoted as 303 in FIG. 8) method X of plugin A invokes method Xs of the intercepting plugins in the Fanout order specified by the InterceptionSeq attribute of plugin A as follows:

method X of plugin 1 is invoked 314
method X of plugin 1 returns 316
method X of plugin 2 is invoked 318
method X of plugin 2 returns 320
method X of plugin 3 is invoked 322
method X of plugin 3 returns 324
. . . .
method X of plugin n is invoked 326
method X of plugin n returns 328
and finally, method X of plugin A returns to the caller 329.

The methods of intercepting plugins return success or failure on function returns.

The sequenced method invocation stops with the first method returning failure condition, and the status returned to the client.

All of the plugins involved in the interception implement the same interface, i.e., their corresponding methods have the same signatures.

Multiple occurrences of the same plugin are not allowed in an interception sequence.

No intercepting plugin in a Fanout type interception sequence is allowed to be a Fanout type plugin or a stack-type plugin.

A plugin is not allowed to be both a Fanout type plugin and a stack-type plugin.

FanOut type plugins are not allowed to be derived (i.e., inheriting) plugins.

The specific rules described above are give for purposes of illustrating a specific embodiment of the invention, and to demonstrate the flexibility of the PIF system. These rules need not be implemented in whole or in part in order to operate the invention, and other rules may be substituted for those described above, while remaining within the spirit and scope of the invention.

Stack Type Interceptors

Figure 9:
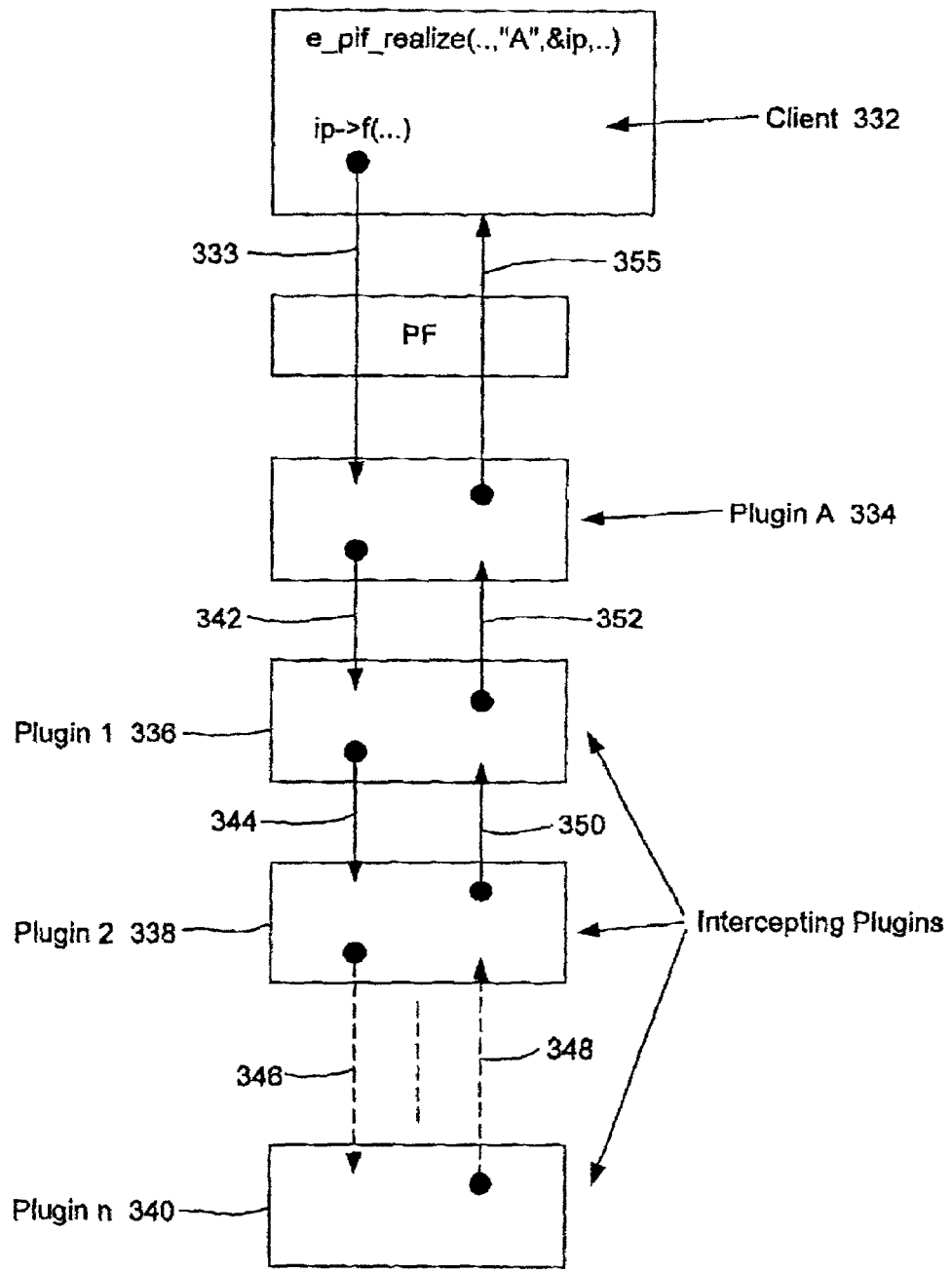
FIG. 9 is a schematic of a stack type Interception in accordance with an embodiment of the invention.
Figure 10:
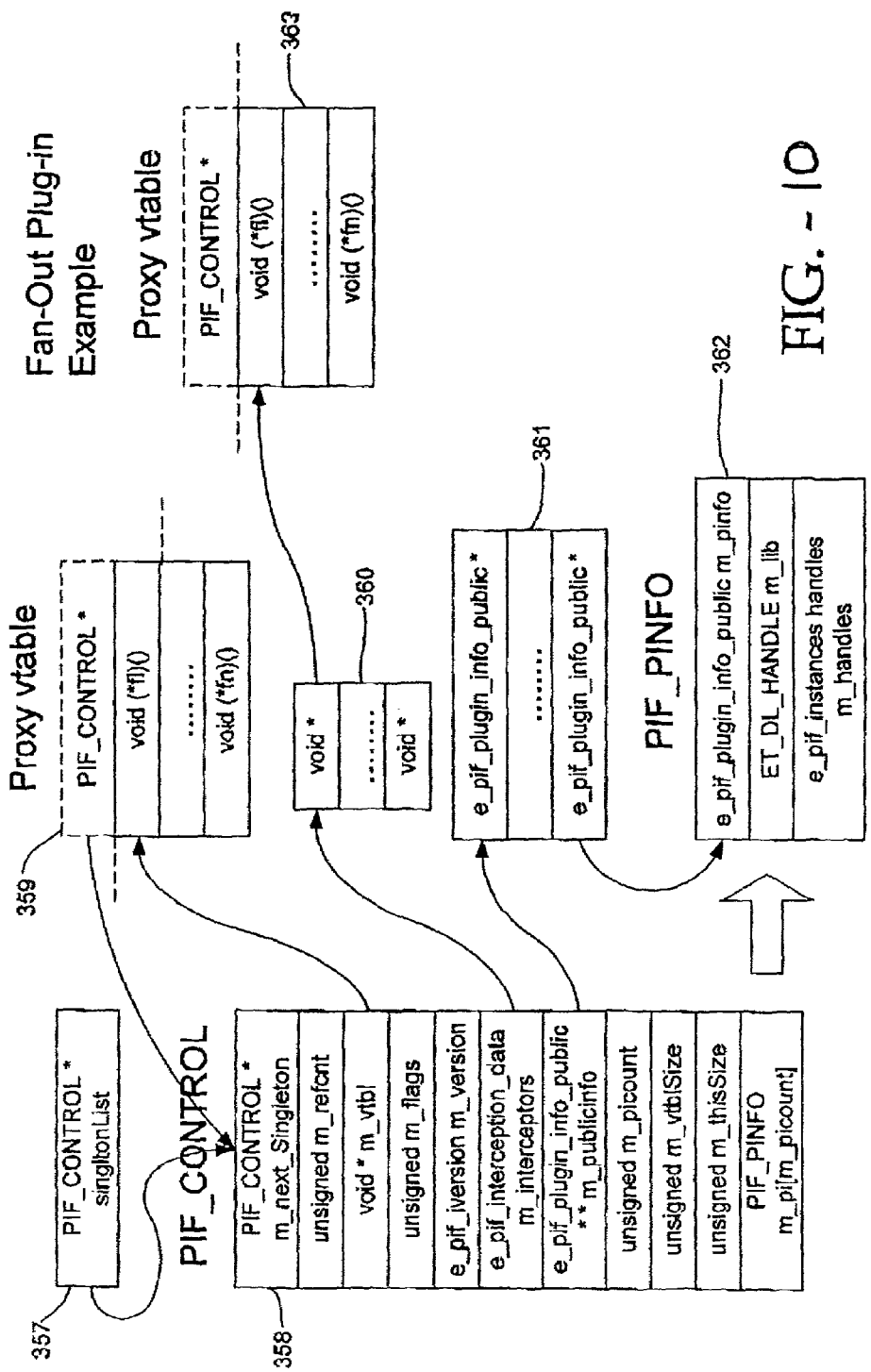
FIG. 10 is a schematic of a realization of an interface with a fanout implementation in accordance with an embodiment of the invention.
Figure 11:
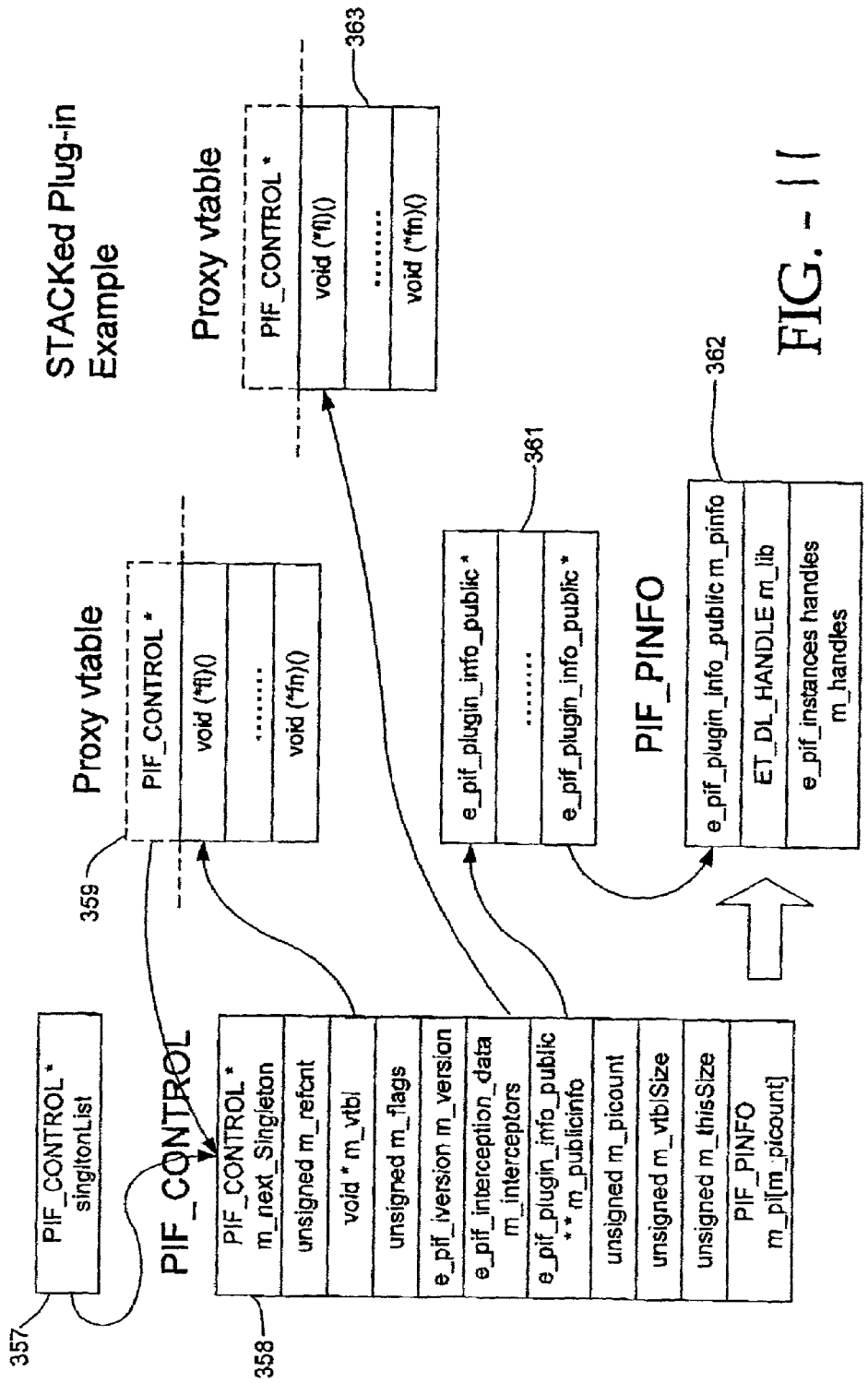
FIG. 11 is a schematic of a realization of an interface with a stacked implementation in accordance with an embodiment of the invention.

Stack type interception is illustrated in FIG. 9. In the Stack type interception model shown in FIG. 9, the client 332 invokes the methods of plugin A 334, but is not aware of the intercepting plugins 336, 338, 340. The PIF is responsible for loading and instantiating the intercepting plugins, as specified by the relevant InterceptionSeq attribute, in addition to plugin A during interface realization, and for building and maintaining the interception sequence.

Subsequent invocations of methods of plugin A by the client (interface caller) result in invocations of the corresponding methods of intercepting plugins in the order specified by the InterceptionSeq attribute. During the realization of an interface involving stack type interception sequence, the PIF passes the interface pointer to the next plugin in the interception sequence via <__ec__pif__instantiate>( ) function of each plugin in the sequence.

The key characteristics of this interception model can be specified as follows:

Given that client invokes method X of plugin A (shown as 333 in FIG. 9), method Xs of the intercepting plugins are invoked in the order specified by the InterceptionSeq attribute of plugin A as follows:

method X of plugin A invokes method X of plugin 1 342
method X of plugin 1 invokes method X of plugin 2 344
. . . .
method X of plugin n−1 invokes method X of plugin n 346
method X of plugin n returns 348
method X of plugin n−1 returns
. . . .

method X of plugin 2 returns 350 method X of plugin 1 returns 352 method X of plugin A returns to the caller 355.

As with the Fanout type interceptors, with Stack interceptors, all of the plugins involved in the interception implement the same interface, i.e., their corresponding methods have the same signatures.

Sequenced method invocation stops with the first method returning failure condition, and this status returned to the client.

All the plugins involved in a stack-type interception sequence are required to be stack-type plugins except that the last intercepting plugin in the sequence is allowed to be a non-intercepting (neither Fanout type nor Stack-type) plugin.

Multiple occurrences of the same plugin are not allowed in an interception sequence.

A plugin is not allowed to be both a Fanout type plugin and a Stack-type (Stack-aware) plugin.

Stack-type plugins are not allowed to be derived (i.e., inheriting) plugins.

The specific rules described above are give for purposes of illustrating a specific embodiment of the invention, and to demonstrate the flexibility of the PIF system. These rules need not be implemented in whole or in part in order to operate the invention, and other rules may be substituted for those described above, while remaining within the spirit and scope of the invention.

Process Threading

In one embodiment of the invention, the PIF can serialize calls to a particular implementation's __ec__pif__instantiate( ), __ec__pif__copy( ), and __ec__pif__destroy( ) function, and make use of separate processing threads. This can contribute greatly to the overall performance of the system.

Interface Function Utilities

The following section illustrates various functions that are used with the PIF system to register implementations and to realize interfaces. It will be evident to one skilled in the art that additional or alternative functions can be used within the spirit and scope of the invention.

__e__dl__load

The __e__dl__load function maps the specified executable module into the address space of the calling process.

```
__e__dl__load (IN __TCADEF, IN const char *dllpath, /* address of
                                                       filename of
                                                       executable module */
              OUT ET__DL__HANDLE *dllhandle,       /* DLL handle */
              IN TM32U        flags               /* flags */
             ) ;
``` wherein __TCADEF is the optional ANSI definition of the engine context (typically used only for Tuscedo implementations).

dllpath is a pointer to a null-terminated string that names the DLL file. If the string specifies a path but the file does not exist in the specified directory, the function fails. If the string does not specify a full path name, the function uses a standard search strategy to find the file.

dllhandle is the DLL handle to be used in subsequent __e__dl__unload and __e__dl__getfuncaddr functions.

__e__dl__unload

The __e__dl__unload function unloads a DLL:

```
__e__dl__unload(IN __TCADEF, IN ET__DL__HANDLE dllhandle,  /* handle to
                                                             loaded library module */
                IN TM32U   flags /* flags */
                ) ;
```

The __e__dl__unload function unloads the specified library from the address space of the calling process. After this call, the specified handle is no longer valid, wherein:

dllhandle identifies the loaded library module. The __e__dl__load function returns this handle.

__e__dl__getfuncaddr

The __e__dl__getfuncaddr function returns the address of the specified exported dynamic-link library (DLL) function:

```
__e__dl__getfuncaddr(IN __TCADEF, IN ET__DL__HANDLE dllhandle,/* handle
                                                                to loaded library module */
                     IN    const char *pFuncName,        /* name of function */
                     OUT   void **pfa,                   /* pointer to pointer to func address */
                     IN    TM32Uflags                    /* flags */
                    ) ;
```

The __e__dl__getfuncaddr function returns the address of the specified exported dynamically loadable library (DLL) function in pfa, wherein:

__TCADEF is The ANSI definition of the engine context as before.

dllhandle identifies the DLL module that contains the function. The __e__dl__load function returns this handle.

pFuncName points to a null-terminated string containing the function name.

Pfa is Pointer to pointer to func address.

__e__dl__addref

The __e__dl__addref function increments the reference count associated with a loaded DLL:

```
_e_dl_addref ( IN        _TCADEF,
    IN ET_DL_HANDLE dllhandle,       /* DLL handle */
    IN TM32U      flags         /* flags */
    ) ;
```

The __e_dl_addref increments the reference count of the DLL specified by dllhandle. It should be called for every new copy of a pointer to an instant of a plugin, wherein: dllhandle identifies the DLL module that contains the function. The _e_dl_load function returns this handle.

_ec_pif_instantiate

The __ec_pif_instantiate function instantiates a plugin:

```
_ec_pif_instantiate (IN _TCADEF,
IN    const char *pIId,        /* pointer to interface id   */
IN    const char *pImplId,     /* pointer to implementation id */
IN    const struct _e_pif_iversion *version, /*interface version */
IN    const struct _e_pif_data *pData, /* data passed from caller
                                           and/or registry */
IN    const struct _e_pif_interception_data *pInterceptionData,
                                        /* interception data */
INOUT struct _e_pif_instance_handles *pI, /* instance cookies */
IN    TM32U flags     /* flags */
) ;
```

The __ec_pif_instantiate( ) function is a container-wide, default plugin instance instantiate function (<_ec_pif_instantiate>( )), invoked by the Plugin Framework (PIF) during the realization of an interface (i.e. as a result of a client invoking _e_pif_realize( )). It is implemented by a plugin implementer and is invoked only if plugin specific instantiate function is not available. If a plugin specific <_ec_pif_instantiate>( ) function is provided, then this function is invoked rather than the DLL-wide __ec_pif_instantiate( ) function. The plugin specific <_ec_pif_instantiate>( ) function has the same function signature as that of __ec_pif_instantiate( ) function, wherein:

pIId is a pointer to the interface identifier.
pimpled is a pointer to the implementation identifier.
version is the version of the interface.
pData is data passed from caller and/or registry.
pInterceptionData is a pointer to interception data.
pI is a pointer to plugin instance handles.

The __ec_pif_instantiate( ) function, given a pointer to an <interface id>, version of the interface and a pointer to an <impl id>, instantiates a plugin implementing the interface being realized and returns a set of handles about the plugin and the instance of the plugin being instantiated in a memory block pointed to by pI. The version specifies the version of the interface whose <interface id> is pointed to by pIId.

The pInterceptionData points to a in-core data structure of data type struct e_pif_interception_data defined as follows:

```
struct e_pif_interception_data {
struct _e_pif_iversion m_pif_version ; /* vers of this structure */
void const * *fanout_interception_seq ; /* ordered sequence of
                                 instance addresses in fanout
                                 type interception sequence */
TM32U fanout_interception_seq_len ; /* number of addresses in
                                 the interception sequence */
void *next_ip ; /* address of plugin instance next (relative to
                 callee) in the stack type interception sequence */
}
```

The pointer pI points to a memory block of data type struct e_pif_instance_handles defined as follows:

```
struct _e_pif_instance_handles { struct _e_pif_iversio m_pif_version
;             /* version of this structure */
void *pVtbl ;      /* address of plugin Vtbl */
void *pPrivData ;  /* address of private data */
struct _e_pif_plugin_info *pPluginInfo ;      /* plugin info */
} ;
```

In the pInterceptionData structure the pVtbl contains the address of the Vtbl of the plugin being instantiated. The pPrivData contains the address of the private data of the instance of the plugin being created. pPluginInfo contains the address of the memory block of type struct _e_pif_plugin_info, containing plugin information specific to the plugin being instantiated. It is the responsibility of the plugin to populate the fields of this structure. The struct _e_pif_plugin_info is declared as follows:

```
typedef struct _e_pif_plugin_info {
struct _e_pif_iversion m_pif_version ;/* version of the Plugin
                                         Framework */
struct _e_pif_iversion m_i_version ; /* version of the interface
                                   implemented by the plugin */
char * m_impl_id ;    /* interface implementation id */
char * m_interface_id ;   /* interface id */
int m_Vtbl_size ;/* size of Vtbl in terms of number of entries */
char * m_vendor ;     /* vendor name */
char * m_productname ; /* product name */
char * m_vendorversion ; /* vendor assigned version number */
TM32U m_flags;   /* flags */
/* addresses of PIF imposed functions */
TM32I (*destroy) (_TCADEF, const struct
_e_pif_instance_handles *, TM32U) ; /* function called by the PIF
                                         to destroy the plugin */
TM32I (*copy) (_TCADEF, const struct _e_pif_interception_data *,
struct _e_pif_instance_handles *, TM32U) ;   /* function called
                            by the PIF to copy the plugin's private data */
} _e_pif_plugin_info, *p_e_pif_plugin_info;
```

The _e_pif_plugin_info structure contains information relevant to the implementation of the interface. The m_flags field defines flags set by the implementation and interpreted by the PIF. In one embodiment of the invention, the following flags are defined:

EF_PIF_SINGLETON—signal or flag that the implementation is a singleton object

EF_PIF_STACK—signal that the implementation is a stack-type intercepting plugin

EF_PIF_FANOUT—signal that the implementation is a Fanout type intercepting plugin EF_PIF_CONCURRENCYAWARE—signal that the implementation (whether it is a derived implementation or a head of a Fanout or STACK type interception sequence) is concurrency aware The EF_PIF_SINGLETON flag is a hint to the Plugin Framework to indicate whether the implementation is a singleton. When a singleton implementation is instantiated, new calls to instantiate the implementation result in a reference to the first plugin instance. The PIF can use this hint to optimize reference handling for other _e_pif_realize( ) calls to this implementation (in that the Plugin Framework is not required to call the __ec_pif_instantiate( ) function).

The flags specified by m_flags field are not mutually exclusive. EF_PIF_QUERY is one example of such a flag. When it is set, __ec_pif_instantiate( ) populates pVtbl and pPluginInfo fields of struct __e__pif__instance__handles pointed to by pI without instantiating the plugin.

__e__pif__realize

The __e__pif__realize function realizes an interface:

```
__e_pif__realize ( IN __TCADEF,
IN    const char *pIId,              /* pointer to interface id */  I
      const char *pImplId,   /* pointer to implementation id */
IN    const struct __e_pif__iversion *version, /* interface version */
IN    const void *data, /* data passed to plugin from the caller */
IN    long datalen,               /* size of buffer data points to */
OUT   void         **pI,       /* interface pointer */
IN    TM32U      flags /* flags */
) ;
```

The __e__pif__realize function realizes an interface specified by pIId and version by instantiating the interface implementation specified by pImplId. The client of an interface should have a pointer to newly created instantiation of a plugin backing the interface before it invokes any function of the interface. It acquires this handle for the interface by invoking the __e__pif__realize function.

The pImplId is either the <impl id> of or a <selector> for the plugin to be instantiated.

If pImplId is specified as NULL, then the default implementation (DefaultImpl) for the interface <interface id> is loaded to back the interface. If no default implementation for the interface is set, then a registered implementation with the equal major version number to that of the interface (being realized) and the highest minor version number is loaded to back the interface subject to the version control rules specified below:

The major version number of the target plugin should match the major version number of the interface. Otherwise, the interface being realized and the target implementation are not compatible.

The minor version number of the target plugin should be equal to or higher than that of the interface being realized. Otherwise, the interface and the target implementation may not be compatible.

If the target implementation is inheriting from other plugins, all of the plugins in the inheritance sequence should have a major version number equal to that of the interface being realized.

If the target implementation is inheriting from other plugins, at least one of the plugins in the inheritance sequence should have a minor version number that is equal to or higher than that of the interface being realized.

If pImplId is specified and EF__PIF__EXACT__MATCH flag is set, then the plugin specified by pImplId is loaded subject to version control rules as specified above. If it is not registered (i.e., not found), then this function fails and returns an EE__PIF__NOT__REGISTERED error value is returned.

If pImplId is specified, but not registered or found, and the EF__PIF__EXACT__MATCH flag is not set, then the system attempts to locate the default implementation for the interface. If the default implementation is not compatible or not found, then the system will attempt to locate a compatible implementation with the highest minor version equal to or greater than the value specified in the version argument. If a compatible implementation does not exist, then the function fails, returning an EE__PIF__NOT__REGISTERED error. The specified plugin is then located according to the search rules associated with the registry such as, for example, first the client's (caller's) profile and then the system-wide profile for the interface ids.

The data point to data passed to the plugin from the caller, and datalen specifies the length of the buffer pointed to by data.

__e__pif__dupref

The __e__pif__dupref function increments the reference count associated with a loaded plugin instance or duplicates a plugin instance:

```
__e_pif__dupref (IN __TCADEF,
IN    void   * pI,              /* pointer to plugin instance */
OUT   void   **ppdup,           /* duplicated plugin instance */
IN    TM32U flags               /* shallow or deep copy */
) ;
```

The __e__pif__dupref increments the reference count of the plugin instance pointed to by pI and duplicates the address of the plugin instance into ppdup. It should be called for every new copy of a pointer to an instant of a plugin.

The flag may include EF__PIF__DEEP__COPY, which if specified, causes the Plugin Framework to create a duplicate copy of the instance specified by pI and return an interface pointer to the duplicate copy into ppdup. The duplicate instance has its own memory block for its private data (if such exists), life control and unique interface pointer.

__e__pif__release

The __e__pif__release function decrements the reference count associated with a loaded plugin instance:

```
__e_pif__release(IN __TCADEF,
IN void * pI, /* pointer to plugin instance to be released */
IN TM32U     flags  /* flags */
) ;
```

The __e__pif__release decrements the reference count of the plugin instance pointed to by interface pointer pi. If the reference count of the specified plugin instance falls to 0, then the plugin instance is destroyed.

__e__pif__iscompatible

The __e__pif__is compatible function checks if a specified interface version is supported by a plugin instance:

```
__e_pif__iscompatible ( IN           __TCADEF,
IN void   * pI,                   /* pointer to plugin instance */
IN const struct __e_pif__iversion *version, /* interface version */
IN TM32U   flags                  /* flags */
) ;
```

The __e__pif__iscompatible checks to see if the plugin instance specified by pI is compatible with the interface version specified by version.

__e__pif__interception__seq

The __e__pif__interception__seq function returns an ordered sequence of addresses of the instances of the plugins in the interception sequence:

```
__e_pif__interception__seq( IN __TCADEF,
IN   void       * pI,
OUT const struct __e_pif__interception__data**ppInterceptionData,
/* interception data */
IN TM32U       flags /* flags */
) ;
```

There may be only one plugin in the sequence, Regardless, the __e__pif__interception__seq returns the addresses of the instances of the intercepting plugins in the calling sequence relative to the plugin instance specified by pI into an in-core data structure of data type struct __e__pif__interception__data pointed to by *ppInterceptionData.

The data structure struct e__pif__interception__data is defined as follows:

```
struct e_pif_interception_data {
struct _e_pif_iversion m_pif_version ;/* version of this structure */
void **fanout_interception_seq ;  /* ordered sequence of instance
addresses in fanout type interception sequence */
TM32U fanout_interception_seq_len ; /* number of addresses in the
interception sequence */
void **next_ip ;        /* address of plugin instance next (relative
to callee) in the stack type interception sequence */
} ;
```

If the caller is a fan-out type plugin, then n ordered sequence of the addresses of the Fanout intercepting plugin instances which make up the interception sequence for the Fanout plugin is returned into an array *fanout__interception__seq. The fanout__interception__seq__len variable specifies the number of addresses in this array.

In the case of stack type intercepting plugins, the address of the next plugin instance in the calling sequence is returned into *next__ip. If the plugin instance specified by pi is the last plugin instance in the interception sequence, then a NULL is returned in *next__ip.

__e__pif__this

The __e__pif__this function is used to return the address of the private data area:

```
_e_pif_this (   IN _TCADEF,
IN      void *pI,
IN const void *pVtbl,
OUT    void **ppriv,
IN TM32U     flags /* flags */
) ;
```

The __e__pif__this returns the address of the private data area of the plugin instance specified by pI. The pVtbl handle points to the plugin specific Vtbl. This is the same Vtbl whose address is returned from <__ec__pif__instantiate>( ) function during the creation of the instance of the plugin.

__e__pif__getinfo

The __e__pif__getinfo function is used to get information about a loaded plugin:

```
_e_pif_getinfo ( IN _TCADEF, IN void * pI,
OUT TM32U *info_seq_len,
OUT const _e_pif_plugin_info_public * const **pInfo,
IN TM32U     flags    /* flags */
) ;
```

The __e__pif__getinfo gets information about a plugin instance specified by pi. This information is returned into the __e__pif__plugin-info-public structure pointed to by pInfo:

```
typedef struct _e_pif_plugin_info_public {
struct _e_pif_iversion  m_pif_version ;    /* version of PIF */
struct _e_pif_iversion  m_i_version ;      /* version of the interface
implemented by the plugin */
char  * m_impl_id ;            /* interface implementation id */
char  * m_interface_id ;       /* interface id */
char  * m_vendor ;             /* vendor name */
char  * m_productname ;        /* product name */
char  * m_vendorversion ;      /* vendor assigned version number */
TM32U    m_flags ;
} _e_pif_plugin_info_public, *p_e_pif_plugin_info_public ;
```

The m__flags field defines flags set by the implementation and interpreted by the PIF, and include EF__PIF__SINGLETON, EF__PIF__STACK, EF__PIF__FANOUT, and EF__PIF__CONCURRENCYAWARE, all of which are described in further detail above. Concurrency awareness always imply composite behavior—if the plugin is a derived plugin or a head of an interception sequence, then this means that all of the plugins involved in the composition are concurrency aware and that if one of the components does not support concurrency, then the composition is not concurrency aware. Consequently, in this case the concurrency aware flag is not returned.

The flags argument specifies optional flags, for example the EF__PIF__DETAILEDINFO flag. If it is specified, __e__pif__getinfo( ) returns detailed information about the plugin specified. If the plugin specified is a derived implementation, then the information about all the implementations involving in the derivation of the plugin are returned, starting from the most derived implementation. If the plugin specified is the head of a Fanout type or STACK type interception sequence, then the information about all the plugins involved in the interception sequence is returned, starting from the plugin specified (head of interception sequence) followed by the intercepting plugins, left-to-right in case of Fanout type, and top-down in case of STACK type.

__ec__pif__destroy

The __ec__pif__destroy function is used to destroy a plugin instance:

```
_ec_pif_destroy ( IN _TCADEF,
INOUT struct _e_pf_instance_handles  *pIhandles,/* instance cookies
*/
IN TM32U        flags        /* flags */
) ;
```

The __ec__pif__destroy releases the plugin instance specific system resources specified by pIhandles. The pIhandles points to a memory block of data type struct __e__pif__instance__handles defined as follows:

```
struct _e_pif_instance_handles {
struct _e_pif_iversion  m_pif_version ;    /*   version of this
structure */
void        *pVtbl ;        /* address of plugin Vtbl */
void        *pPrivData ;/*  address of plugin instance specific
private data */
struct _e_pif_plugin_info    *pPluginInfo ;   /* plugin info */
} ;
``` wherein the pVtbl contains the address of the Vtbl of the plugin instance, and pPrivData contains the address of the private data of the plugin instance being destroyed. If no private data is used by the plugin instance, then the value of pPrivData is set to NULL. pPluginInfo contains the address of the memory block of type struct _e_pif_plugin_info, containing plugin information specific to the plugin instance. This function is only invoked by PIF when the reference count associated with a plugin instance falls to 0.

_ec_pif_copy

The _ec_pif_copy function creates a duplicate copy of a plugin instance:

```
_ec_pif_copy ( IN _TCADEF,
IN    const struct _e_pif_interception_data *pInterceptionData,  /*
interception data */
INOUT struct _e_pif_instance_handles    *pIhandles, /* instance
cookies */
IN TM32U   flags    /* flags */
);
```

The _ec_pif_copy creates a duplicate copy of plugin instance private data specified by pIhandles and returns pointers to duplicate copies in the data structure pointed by pIhandles.

The pInterceptionData points to an in-core data structure of data type struct e_pif_interception_data (defined above), while the pIhandles points to a memory block of data type struct _e_pif_instance_handles (also defined above).

The pVtbl is a pointer containing the address of the Vtbl of the plugin instance whose private data are being duplicated. pPrivData is a pointer containing the address of the plugin instance private data. If no private data are used by the plugin instance, then NULL is returned. The pPluginInfo pointer contains the address of the memory block of type struct _e_pif_plugin_info, containing plugin instance specific information which is declared as follows:

```
typedef struct _e_pif_plugin_info {
struct _e_pif_iversion m_pif_version ;    /* version of the Plugin
Framework */
struct _e_pif_iversion m_i_version ;    /* version of the interface
implemented by the plugin */
char * m_impl_id ;     /* interface implementation id */
char * m_interface_id ;    /* interface id */
int m_Vtbl_size ;        /* size of Vtbl in terms of number of
entries */
char * m_vendor ;    /* vendor name */
char * m_productname ; /* product name */
char * m_vendorversion ; /* vendor assigned version number */
TM32U m_flags;  /* flags */
/* addresses of PIF imposed functions */
TM32I (*destroy) (_TCADEF, const struct _e_pif_instance_handles *,
TM32U) ;    /* function called by the PIF to destroy the plugin */
TM32I (*copy) (_TCADEF, const struct _e_pif_interception_data *,
struct _e_pf_instance_handles *, TM32U) ; /* function called by the
PIF to copy the plugin's private data */
} _e_pif_plugin_info, *p_e_pif_plugin_info;
```

The _e_pif_plugin_info structure contains information relevant to the implementation of the interface. The m_flags field defines flags set by the implementation and interpreted by the PIF. Flags may include EF_PIF_SINGLETON, EF_PIF_STACK, EF_PIF_FANOUT, and EF_PIF_CONCURRENCYAWARE /*, all of which are described in further detail above.

epifreg

The epifreg function or command registers a plugin implementation, and uses the following syntax:

```
epifreg  -p implid -i interfaceid -v Major.Minor -f imagePath \
[-e entryFunction]   [-b baseImplid]   [-o profileId]
[-u userParameters]  \
[-s InterceptorType [:implid1 ,..., implidN] ]
```

The epifreg function can take a variety of options as indicated above, wherein the options have the following meaning:

-p Implementation identifier of the plugin to be registered. An implementation identifier is a unique value that has the following syntax: <implid>::=<component name>[/<sub-component name>]/<implementation name>.

-i Identifier of the interface implemented by the plugin. An interface identifier is a unique value that has the following syntax: <interfaceid>::=<component name>[/<sub-component name>]/<interface name>. If the interface does not exist in the registry then, it is automatically created.

-v Version number of the interface implemented by the plugin. A version number is composed of a major version number and a minor version number.

-f Path name of the container or dynamic loadable library (DLL) containing the plugin implementation.

-e Name of the function implementing the _ec_pif_instantiate ( ) routine. This function is used by the Plugin Framework to instantiate the plugin. If this option is not specified, the Plugin Framework will use the default _ec_pif_instantiate ( ) routine.

-b This option is used to specify that this plugin uses implementation inheritance.

-o This option is used to add the plugin to the specified profile. If the profileId does not exist, a new profile is created. Profiles can be associated with a processes by setting the EV_PIF_PROFILE environment variable to a profile identifier. The Plugin Framework always searches the plugin information in the specified profile before it searches the default system-wide profile "SYSTEM".

-u User parameters (for example, a string of characters) to be passed to the implementation of a plugin during its instantiation.

-s This option is used to specify that the plugin is an interceptor. The interceptorType argument refers to the type of interception implemented by the plugin and its value can either be STACK or Fanout. Optionally, an interception sequence can also be specified after the ':' character. This interception sequence is a comma-separated list of implementation identifiers that specifies the intercepting plugins and the interception order.

epifunreg

The epifunreg function unregisters a plugin:

epifunreg -p implid [-o profileId]

The epifunreg command unregisters the specified plugin. The -p option specifies the implementation identifier of the plugin to be unregistered. If this option is used alone then, the plugin's data stored in the Plugin Framework is unregistered (including the data stored in all of the existing profiles). The -o option can be optionally used to specify that the information about the plugin should be removed from the specified profileId. This command does not remove the data about the related plugin's interface, which can be removed with the epifregedt command.

epifregedt

The epifregedt function edits the attributes of implementations, interfaces, and profiles stored in the Plugin Framework registry:

epifregedt [-g|-s|-d|-c|-m]-k Key [-a AttrName[=AttrValue]

The epifregedt command edits the attributes of a PIF registry object specified with the -k option. Registry objects are uniquely identified within the registry with their corresponding Key. The Key of a PIF registry object has the following syntax:

<ProfileId>[/impl|interfaces/<ObjId>]

wherein:

<ProfileId> is the profile id of the profile the object is registered in.

impl specifies that the object is an implementation object.

interfaces specifies that the object is an implementation object.

<ObjId> specifies an interface object id (InterfaceId) or an implementation object id (ImplId).

The Plugin Framework searches the specified profile in the registry for the specified interface and/or implementation object data. The <Profileid> or <ObjId> can be specified as "*" to indicate that the edit operation applies to all existing profiles or interface/implementation ids, respectively. "SYSTEM" is the <Profile id> for the default system-wide profile.

The -a option is used to specify the attributes involved in the editing operation on the specified object. The AttrName is the name of an attribute of the edited object and AttrValue is the value assigned to this attribute. Some attributes can be used to narrow the scope of the particular editing operation (such as a set, create, or delete).

The following options specify the editing operation performed by the epifregedt command:

-g Get the values of the selected attributes of the specified object. If no attributes are specified with the -a option then, all attributes of the object are retrieved. Otherwise, only the specified attributes are retrieved. With this and all the other options, if AttrValue is supplied, it is specified, then it is used to narrow the scope of this operation. In the case of multiple AttrName attributes with the corresponding AttrValue values are specified, then only the objects with the identical AttrValue values for the corresponding AttrName attributes are retrieved.

-s Set, create, or change the values of the selected attributes of the specified object. Some attributes are required when a new object is created in the registry. These attributes are specified with the -a option.

-d Delete the selected attributes of this specified object. If no attributes are specified with the -a option then, the object and all its attributes are removed from the registry. Otherwise, only the specified attributes are deleted.

-c Copy the specified object to another profile. The new profile should be specified with the -a option using the Profileld as the value for AttrName and the new profile identifier as the value of AttrValue.

-m Move the specified object to another profile. The new profile should be specified with the -a option using the Profileld as the value for AttrName and the new profile identifier as the value of AttrValue. If the target profile does not exist then, a new profile is created.

Example Implementation

This section provides a sample code illustration demonstrating how to construct a PIF compliant client application and a corresponding plugin. The following files are shown merely for demonstration purposes to better illustrate the invention. It will be evident to one skilled in the art that the procedures used may be extended to apply to more complex situations and applications, and that the invention is not limited to the C language examples give below.

The plugin can be defined in a metalanguage format using a plugin wizard or similar tool. The metalanguage defines the plugin operations, and also such variables as the plugin name, the interface name, and the interface version number.

Plugin Description File

The following plugin description file (dummy.pi) is an example of a description file used to define a plugin. The plugin description may, in some embodiments, be created by a plugin wizard or plugin design tool. At a minimum it should contain a plugin name (in this case "dummy"), an interface name ("sec"), and an interface version number ("1.2"). The plugin should also contain a number of operations (in this example denoted as op 1, op 2, op 3, and op 4. The operations define the functions the plugin will actually provide to the calling application.

```
========= dummy.pi =========
@plugin dummy
@interface sec
@interface_version 1_2
@operations
void op1(int i, double k)
int op2(void *foo)
void *op3(const char *x)
char * op4( )
@end
```

Plugin Header File

The dummy.h file below is an example of a generated include or header file which is output by the plugin wizard. The header file must be included at compile time into each plugin implementation and client application. The include file provides a specification of the particular interface in which the plugin operates.

```
========= dummy.h =========
#ifndef dummy_h
#define dummy_h
#include "e_eng_pif.h"
struct sec_1_2 ;
typedef struct sec_1_2_Vtbl {
    void    (*op1) (struct sec_1_2 *, int i, double k);
    int     (*op2) (struct sec_1_2 *, void *foo);
    void*   (*op3) (struct sec_1_2 const char *x);
    char *  (*op4) (struct sec_1_2 *);
} sec_1_2, *sec_1_2_ptr ;
#define sec_1_2_op1 ( ip, _a1, _a2) \
    (ip->op1 (ip, (_a1), (_a2)))
#define sec_1_2_op2 (ip, _a1) \
    (ip->op2 (ip, (_a1)))
#define sec_1_2_op3 (ip, _a1) \
    (ip->op3 (ip, (_a1)))
#define sec_1_2_op4 (ip) \
    (ip->op4 (ip))
#endif /* dummy_h */
```

In this example, the include file includes a name ("dummy"), and a data structure definition that defines the data structure for the particular interface and version number (in this case sec. 1.2). The data structure includes pointers for all of the operations supported by this particular interface and version number.

Plugin Application File

The dummy.c file below is an example of the generated skeleton template, and represents the actual plugin application. The only modifications from the generated .h file is the replacement of the generated comments in each of the operation implementations with actual code, and the addition of private data members to the Private data structure. The c file when compiled is used to provide the actual plugin implementation. Certain verbs (such as pif-destroy and pif-copy) are required in order for the interface to handshake successfully with a calling application. Other verbs (op1, op2, op3, op4) provide the functional operations of the plugin framework.

```
========= dummy.c =========
#include "dummy.h"
#include <malloc.h>
#include <string.h>
#include "e_eng_pif.h"
typedef struct {
    .....
} Privatesec_1_2, *Privatesec_1_2_ptr;
int
sec_1_2_ec_pif_destroy_impl(const
struct _e_pif_instance_handles *pI)
{
 ....
    if (pI->pPrivData != NULL)
free (pI->pPrivData );
}
int
sec_1_2_ec_pif_copy_impl(const
struct   _e_pif_interception_data
*pInterceptionData, struct _e_pif_instance_handles *pI) {
    .....
}
static void
sec_1_2_op1_impl(struct sec_1_2   *ip , int i, double k)
{
    .....
}
static int
sec_1_2_op2_impl(struct sec_1_2   *ip ,   void *foo)
{
    .....
}
static void *
sec_1_2_op3_impl(struct sec_1_2 *ip , const char *x)
{
    .....
}
static char *
sec_1_2_op4_impl(struct sec_1_2 *ip)
{
    .....
}
static const _e_pif_plugin_info sec_1_2_plugin_info = {
/* m_pif_version.i_major_version */ 1,
/* m_pif_version.i_minor_version */ 0,
/* m_i_version.i_major_version */ 1,
/* m_i_version.i_minor_version */ 2,
/* m_impl_id      */ "sec1",
/* m_interface_id */ "sec",
/* m_Vtbl_size */ 4,
/* m_flags */ 0,
/* Plugin Vendor Info */
/* m_vendor        */ "RSA",
        /* m_productname   */ "Roadrunner Exterminator",
        /* m_vendorversion */ "2000",
        /* PIF imposed functions */
        sec_1_2_ec_pif_destroy_impl,
        sec_1_2_ec_pif_copy_impl,
    };
static sec_1_2_Vtbl Vtblsec_1_2 = {
        sec_1_2_op1_impl,
        sec_1_2_op2_impl,
        sec_1_2_op3_impl,
        sec_1_2_op4_impl,
};
#ifdef _cplusplus
extern "C"
#endif
#ifdef WIN32
_declspec(dllexport)
#endif
int
sec_1_2_instantiate (
IN     const char *pIId, /* pointer to interface id
IN     const char *pImplId,  /* pointer to implementation id */
IN     struct _e_pif_iversion *version,     /* interface version */
IN     const struct _e_pif_data      *pData     /* data passed from caller and/or registry */
IN     const struct _e_pif_interception_data   *pInterceptionData,
/* interception data */
INOUT    struct _e_pif_instance_handles     *pI,  /* pointer to instance of plugin
IN     TM32U flags /* flags */
)
{
    Privatesec_1_2_ptr priv;
    .....
if (flags & EF_PIF_QUERY) {
pI->pPluginInfo = & sec_1_2_plugin_info ;
}
else {
priv = (Privatesec_1_2_ptr) calloc(1, sizeof *priv) ;
if ( ! priv ) {
 return EE_PIF_NORESOURCE ;
}
pI->pVtbl = &Vtblsec_1_2 ;
pI->pPrivData = priv ;
pI->pPluginInfo = & sec_1_2_plugin_info ;
}
    .....
return ;
}
```

Application File

The test.c file shown below is an example of a client application that loads and invokes operations on the plugin. The client application is written so as to call the required interface definitions (specified in dummy.h). The client application must successfully realize the desired interface (sec) with the specified plugin. Thereafter it uses a pointer (pin) to refer to an implementation vtable (Vtbl). The operations themselves are called through a series of put commands.

```
========= test.c =========
#include <stdio.h>
#include "e_eng_pif.h"
#include "dummy.h"
main( )
{
    struct sec_1_2 *pin;
    struct _e_pif_iversion version;
    version.i_major_version = 1 ;
    version.i_minor_version = 2 ;
    if (_e_pif_realize("sec",  "sec1", &version,  NULL, NULL, &pin, NULL, 0) != EE_PIF_SUCCESS) {
        puts("can't realize interface with the specified plugin");
        exit(1);
    }
    puts(">>> Calling op4") ;
    puts(sec_1_2_op4(pin) ) ;
    puts(">>> Calling op3") ;
    puts( (char *) sec_1_2_op3(pin, "hello world!") ) ;
    puts(">>> Calling op4") ;
```

```
    puts(sec_1_2_op4_(pin) ) ;
    _e_pif_release(pin);
    .......
}
```

The client does not need to specify an actual implementation (although it does in this example). When an implementation is not specified the client is given the default implementation for that interface.

Function Design Specification

In this section, an example of a design for the function-by-function realization of an interface process supporting both (a) implementation inheritance and (b) no implementation inheritance cases is presented. The example design supports interface inheritance even though it may not be a requirement for all embodiments of the engine. The key aspects of this particular design are as follows:

The client is presented a realized interface as a C struct, of which the member variables are the pointers to functions of an implementation that are implementing the function signatures of the interface, regardless of whether the implementation backing the interface is a single implementation, or a derived implementation. The client is not aware of whether the realized interface is an original interface or a composite or inherited interface, and instead sees it as a single interface.

The interface method invocations pass an interface pointer to the plugin instance as the first argument.

The implementation methods may access per instance private data by invoking an _e_pif_this( ) function provided by the PIF.

Figure 12:
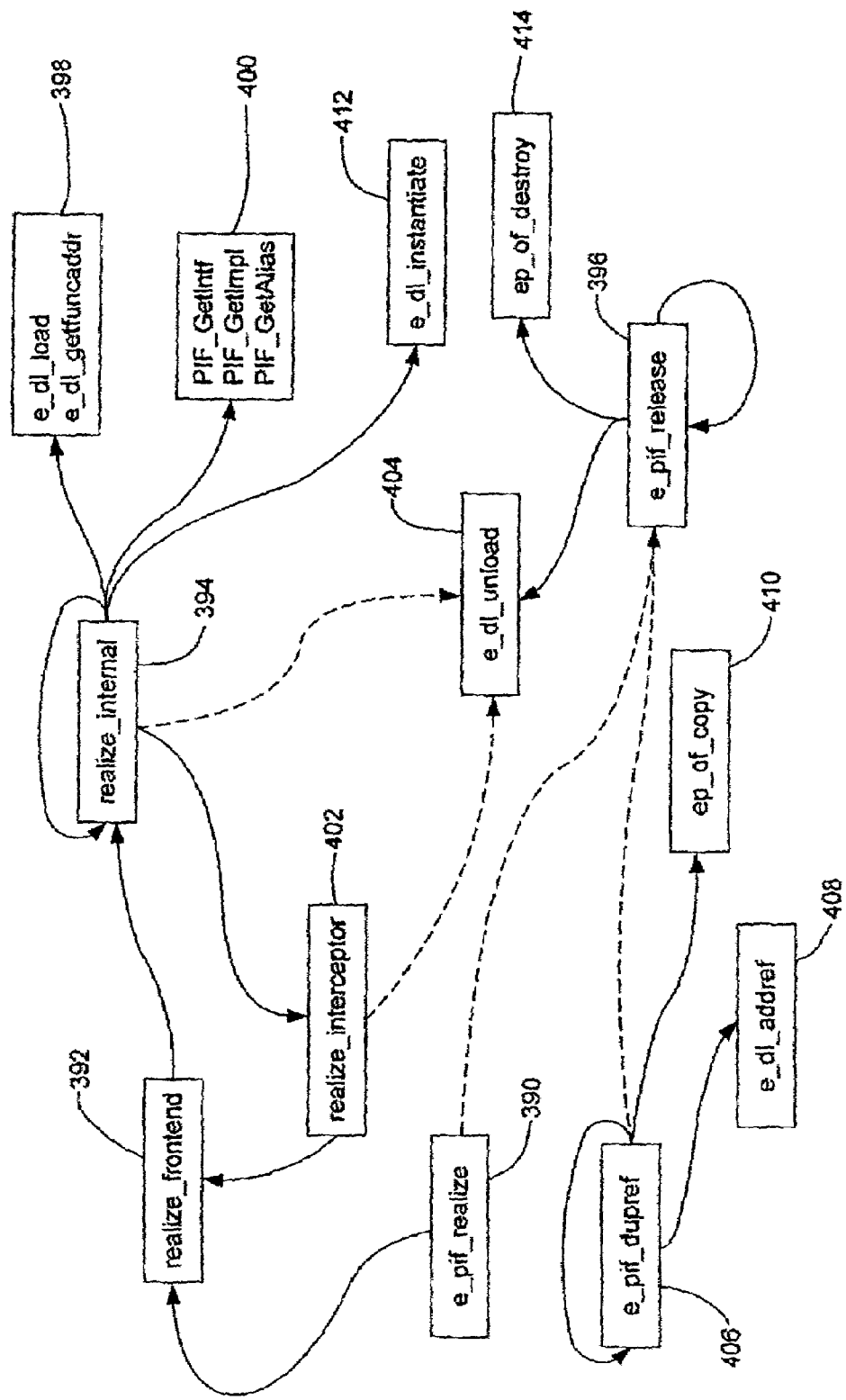
FIG. 12 is a flow diagram of a realization process in accordance with an embodiment of the invention.

The realization and implementation process of this particular design embodiment is shown in FIG. 12. As shown in FIG. 12, the process includes a realization phase, interceptor phase, load and unload phases, and a rehears phase. These are discussed in further detail below.

_epif_realize( ) 390

The e_pif_realize function 390 calls pif_init to initialize a mutual exclusion lock routine (mutex). A mutex is an abstract structure that enforces a policy of mutual exclusion. Traditionally, only one process thread at a time may hold a particular mutex, and threads trying to lock a held mutex will block until the mutex is unlocked. Mutexes must be exited in the opposite order in which they were entered, and that they cannot be reentered before exiting.

If the registry plugin is not already realized, then the process will attempt to realize it. This instance of the registry plugin can be cached for performance benefits. The count of active plugin's is incremented to reflect the new plugin and the mutex is then unlocked.

Since the process does not know when the framework will no longer be needed it keeps track of how many plugin instances are active at any given time. Whenever this count drops to zero the cached registry plugin is released. The use of cache for optimization is only useful when there will be at least one active plugin instance when other plugins are being realized. If the design model is such that only one plugin is ever active at a time, then the registry plugin will be realized and released each time. A side effect of caching the registry plugin is that the underlying registry being used does not see registry changes until the registry is closed and re-opened.

The process then calls the realize_frontend function 392. If this is not successful then the mutex is locked the active plugin count is decremented. If the active count goes to zero then the registry plugin is released, and the mutex unlocked.

realize_frontend( ) 392

The process continues with a realize_frontend function 392 which as a first step constructs a PIF_RARGS stack using supplied arguments and calls realize_internal 394. If realize_internal finds a singleton plugin value then the corresponding singleton is returned. If realize_internal finds a stack interceptor then the handle or pointer of the first plugin in the stack is returned. If realize_internal returns anything else but SUCCESS then an error is returned. If none of the above criteria are met, the plugin is constructed from its components. The realize_frontend function loops through each implementation and verifies the major version number, while at the same time looking for both the highest minor version number and the largest Vtbl size.

A verification step ensures that the highest minor version number is greater than or equal to that requested. The size block of memory required is computed and allocated. One block of memory is allocated for the variable sized PIF_CONTROL block, the Proxy Vtbl, the fan-out interceptor array, and the array of info_public pointers.

The PIF_CONTROL block is filled in, as is the Proxy Vtbl by looping through each implementation's Vtbl, and filling in empty entries in the Proxy Vtbl with non-nil entries from the Vtbls.

The the filled-in Proxy Vtbl is checked for empty entries, and if any are found, a NORESOURCE error is returned.

realize_internal( ) 394

One of the additional arguments is an array of the PIF_PINFO data structure that is declared as a local. This array is used so all the implementations making up the complete plugin can be instantiated first so that the realization process knows how big a chunk of dynamic memory to allocate. This is dependent on both the depth of implementation inheritance, and on the size of the largest Vtbl within all the implementations that make up the complete plugin. Because this array is allocated before the process knows the actual depth of implementation inheritance the framework may impose an implementation restriction on the maximum depth of implementation inheritance allowed. If during the realization process this limit is reached the process will fail and an returned.

If no implementation identifier is specified then the first read of the registry is to call GetIntf 400 using the specified interface identifier and major version number of the interface. If the DefaultImpl attribute is non-null then it is used as the implementation identifier.

If no implementation identifier is specified and the DefaultImpl attribute mentioned above is nil then the HighestMinorImpl attribute is looked at.

If an implementation identifier is specified, or one is determined from the above steps, the next step is to see if the identifier is a selector or alias by calling GetAlias 400. If no match is found then the implementation identifier is not an alias. If a match is found then what is now known to be an alias is used as an attribute name and it's value is read from the registry. The value of this attribute is then used as the implementation identifier, but is first checked recursively to see if the alias mapped to another alias.

Using the interface identifier argument and the resultant implementation identifier a list of singleton plugins that have already been realized (and have not yet been released) is checked for one whose most derived implementation's info structure has the appropriate m_interface_id and m_impl_id fields. If a match is found then _pe_pf_dupref is called on the matching plugin and the new pointer is returned. The search for an existing matching singleton is not done when the implementation being instantiated as a base implementation.

Using the resultant implementation identifier GetImpl 400 is called. If the implementation does not exist, an error is returned, unless the identifier used is the one originally specified by the caller, in which case the process starts at the top as if the caller had not specified an implementation identifier.

The realize_internal next checks the InterceptionType attribute. If this attribute indicates anything other than "NoInterceptor" then it calls an internal routine that handles the realization of an interceptor. This step is skipped if the implementation being realized is one that was specified in a stack Interception Sequence.

If the InterceptionType attribute is set then the process calls realize_interceptor 402.

If the InterceptionType is STACK then a pointer is alos set to the next stack member.

The _e_dl_load function is called using either the ImagePath attribute or the implId.

The _e_dl_getfuncaddr function 398 is called using either the EntryFunc attribute or the default "_ep_dl_instantiate". The plugin's _ep_dl_instantiate function is then called.

The appropriate info_public structure (m_pinfo in the PIF_PINFO struct) is initialized from the corresponding implementations private info structure.

_e_dl_unload ( ) 404

The value of the ImagePath attribute is passed to _gp_dl_load. Then the value of the EntryFunc attribute is passed to _gp_dl_getfuncaddr 398 to get the address of the plugin's instantiation routine. The instantiation routine is called with the appropriate arguments that come from those passed in to _pe_pf_realize and internally generated.

The realize_internal checks the InheritsFrom attribute. If this attribute exists then it calls realize_internal recursively with the value of the said attribute The implementation identifier specified in the InheritsFrom attribute when realized by the framework is realized as if the EF_PF_EXACT_MATCH flag was specified.

Once control is returned to _pe_pf_realize from realize_internal then the size of the Proxy Vtbl needed is determined, and the depth of inheritance is known.

At this time the system can now check to make sure that there exists at least one implementation making up the complete plugin that implements at least the minimum minor version number requested by the caller. This check is made by looking at each implementation's _e_pf_plugin_info data structure. If this check fails then a version mismatch error is returned.

A PIF_CONTROL data structure can now be allocated. The stack local array of PIF_PINFO data structures is copied to the m_pi field.

The Proxy Vtbl is now also filled in. Starting with the most derived implementation and ending with the least derived implementation the following is done. For every non-nil entry in the implementations static Vtbl for which there is a nil pointer at the same offset in the Proxy Vtbl, the pointer from the implementations static Vtbl is copied to the Proxy Vtbl.

The Proxy Vtbl is checked to make sure there are no nil pointers. If any are found, then everything is released and an error returned.

The m_publicinfo field of every member of the m_pi field of the PIF_CONTROL structure can be initialized by simply copying the corresponding fields from each corresponding implementation's private "info" structure. The vector of pointers pointed to by the m_public info field of the PIF_CONTROL structure is initialized to point to the appropriate m_public info fields in the array of PIF_PINFO structures (m_pi).

Each implementation's info data structure is checked to see if the m_singleton flag is set. If every implementation has this flag set then the PIF_SINGLETON flag in the PIF_CONTROL structure is set. If this flag is set then the PIF_CONTROL structure is linked into a linked list of singleton plugins using the m_nextSingleton pointer.

realize_interceptor( ) 402

Clients or calling applications (callers) make calls to realize_frontend on each implId in the sequence with rdepth+1 and the EXACT_MATCH and IGNORE_ISEQ flags.

The returned pointer ip is stored in the PIF_RARGS structure. If it is a Fan-out interception type then fanoutLen (PIF_RARGS) is set to the sequence length. For both interception types the implementation identifiers specified in the InterceptionSeq attribute when realized by the framework are realized as if the EF_PF_EXACT_MATCH flag was specified.

For a FAN-OUT type of interceptor the realize_internal function is called N times with the same arguments as the original call to _pe_pf_realize except for the implementation identifier argument which is replaced with the corresponding one from the sequence. N is the number of implementation identifiers in the sequence. The realize_internal function is then called again, this time with a sequence of pointers to the realized intercepting plugins.

For a STACK type of interceptor the realize_internal function is also called N times with the same arguments as the original call to _pe_pf_realize. This time the sequence of implementation identifiers is traversed backwards. Additionally, on each call to realize_internal, except the first, a single pointer to the last intercepting plugin realized is passed. If the ImagePath registry attribute exists on the registry key that defined the interceptor sequence, the key is treated as if it were the first plugin in the stacked interception sequence.

_e_pif_dupref( ) 406

In the non-deep copy case the reference count stored in the PIF_CONTROL data structure is simply incremented and the same pointer returned.

In the deep copy case the following is done: A new PIF_CONTROL data structure is allocated.

If the PIF_STACKI flag is set then _pe_pf_dupref 406 is called on the next plugin in the stack. The new pointer returned is saved in the m_interceptors field of the new PIF_CONTROL data structure allocated. The recursion is done first because the pointer to the next plugin in the new stack is needed before any of the copy routines for any of the implementations for the current plugin are called.

If the PIF_FANOUTI flag is set then _e_pf_dupref 406 is called on each of the plugins in the fan-out interception sequence and the returned pointers stored in the corresponding fields of the new PIF_CONTROL data structure. This recursion is done first because the new sequence is needed before any of the copy routines for any of the implementations for the current plugin are called.

The new PIF_CONTROL data structure is populated from the original PIF_CONTROL data structure, and the reference count of the new PIF_CONTROL set to 1. Using the new PIF_CONTROL data structure the plugin's copy routine (pointed to by its _e_pf_plugin_info data structure) is called. In the case of implementation inheritance each plugin in the inheritance list has it's copy routine called.

_e_pif_release( ) 396

The reference count in the PIF_CONTROL data structure is decremented, and if the count after being decremented is greater than zero (0) then it simply returns.

The first thing that is done when the reference count goes to 0 is to call the plugin's destroy routine so it can release any of it's resources. In the case of implementation inheritance the destroy routine of the most derived implementations are called first.

If the plugin being released is part of a stacked interceptor chain then _pe_pf_release is called recursively on the next plugin in the chain.

If the plugin being released is a fan-out plugin, then each of the corresponding intercepting plugin's is released.

If the PIF_SINGLETON flag is set in the PIF_CONTROL data structure then the linked list of realized singleton plugin's is checked to see if this plugin is on that list, and if so it is removed from that list.

Finally, the dynamic library handle is unloaded 404, and then the PIF_CONTROL data structure freed.

When the count of active plugins goes to zero the cached registry plugin reference is released.

If a release flag is set, then the _e_pif_release function is called on the next stack interceptor (if any) and on the sequence of fan-out intercepting plugins.

_e_pif_this( )

The process then simply indexes through the array of PIF_PINFO's in the PIF_CONTROL looking for one whose pVtbl instance handle matches the passed in key. If a match is found return the corresponding pPrivData pointer is returned.

_e_pif_interception_seq( )

A pointer to the m_interceptors field in the PIF_CONTROL is returned.

_e_pif_getinfo( )

The length and pointer to the array of public info pointers from the PIF_CONTROL is returned.

It will be evident to one skilled in the art that while some functions and routines described herein were specified as having certain characteristics, features, and constraints on conforming to certain rules, that these rules need not be adhered to in full or in part in order to operate the invention, and that the examples given are for the purposes of illustrating an embodiment of the invention.

Example Deployment

Figure 13:
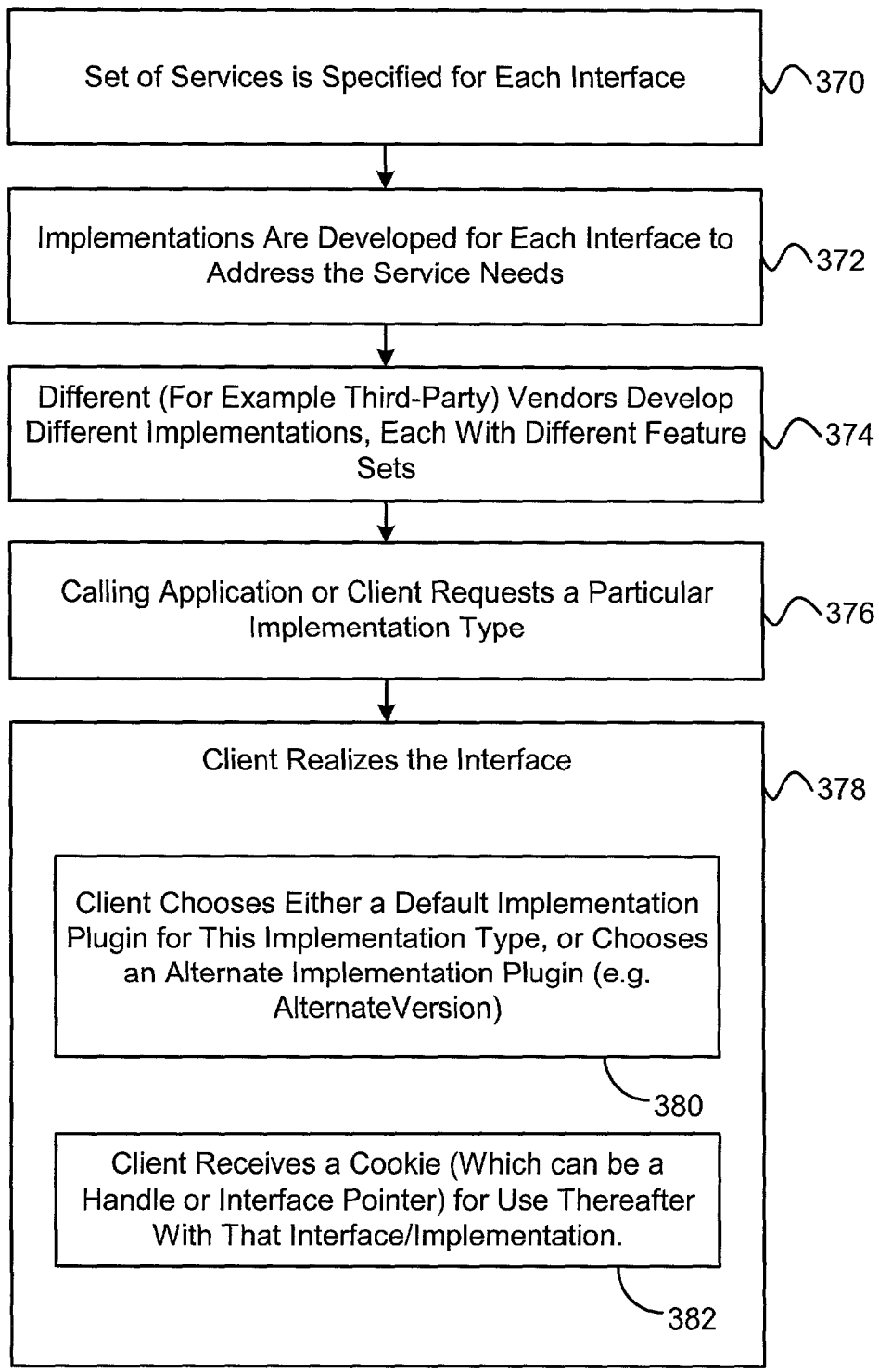
FIG. 13 is a flowchart of interface specification process in accordance with an embodiment of the invention.

FIG. 13 illustrates a flowchart of an example of a method of deploying the invention in a typical client/server environment. As shown in step 370 a set of services is specified by a developer or an administrator for each interface offered by the server. In step 372 implementations are developed for each interface to address the particular service needs of that interface. In step 374 different entities, such as other developers and third-party vendors develop different implementations for that interface, each implementation having a different feature set. In step 376 the calling application or client accesses the server engine and requests a particular implementation type. In step 378, the client makes a call to _e_pif_realize to realize the desired interface. In this process an interface unique identifier is generated and given to the client. The client may then choose (380, depending on its configuration) either a default implementation plugin for this implementation type, or an alternate implementation plugin (for example, the client may specifically request the "AlternateVersion" named implementation). The client receives a handle (which in some cases may be in the form of a token or cookie that the client can store within the client application itself for future use (382). The handle is used as a pointer into the v table data space populated by the implementation, and hence into the service implementation itself.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer-implemented framework architecture system for allowing a client application to communicate with a server component application, comprising:
   a server having a server engine that provides client access to the server, said server engine further including
      a server component that provides a service;
      an implementation within said server component that provides functions of said service, wherein said implementation is dynamically linked and loaded into the server engine, so that the server engine is not reconfigured and recompiled;
      an interface that allows a client application to access said implementation, wherein said interface is dynamically customized and loaded into the clients address space;
      a realization mechanism for allowing the client application to realize said implementation, wherein said implementation includes a vtable, private data store, and per-instance data structure, and wherein the realization mechanism retrieves the information stored within the vtable, private data store, and per-instance data structure, uses this information to populate a proxy vtable, and returns a pointer to the proxy vtable to the client application; and
   wherein the client application uses this pointer to thereafter communicate with said implementation.

2. The framework architecture system of claim 1 wherein said server component includes a plurality of implementations, and wherein said interface allows said client application to select and access one of said implementations.

3. The framework architecture system of claim 1 wherein said implementation is a plugin implementation and can be replaced by another implementation at run time.

4. The framework architecture system of claim 1 wherein said interface provides an interface definition specification for the functions provided by said implementation of said server component.

5. The framework architecture system of claim 4 wherein said interface presents a data type structure according to said interface definition specification of which each member of said data type structure is a function pointer to the implementation functions implementing the services defined by said interface.

6. The framework architecture system of claim 1 further comprising:
an interface namespace containing a record for said interface together with an interface identifier.

7. The framework architecture system of claim 1 wherein said interface is associated with a version.

8. The framework architecture system of claim 1 wherein there exists multiple implementations for said interface.

9. The framework architecture system of claim 1 wherein there exists multiple interfaces providing the same implementation for said server component.

10. The framework architecture system of claim 1 wherein said implementation inherits from another implementation of the same interface a subset of interface methods and functions.

11. The framework architecture system of claim 3 wherein implementations are plugged into said engine and removed from said server engine by a registration process.

12. The framework architecture system of claim 1 wherein said implementation is stored in a container that is loaded by the server engine at run-time.

13. The framework architecture system of claim 12 wherein said container is a dynamic loadable library.

14. The framework architecture system of claim 12 wherein said container contains multiple plugins.

15. The framework architecture system of claim 1 wherein said implementation includes an interceptor for adding services to said server component.

16. The framework architecture system of claim 15 wherein said interceptor is a stack interceptor which during the realization of an interface implementation causes each plugin in an interception sequence to be instantiated in turn.

17. The framework architecture system of claim 1 further including a registry for persistent storage of implementations.

18. The framework architecture system of claim 1 wherein said implementation is a software personality.

19. The framework architecture system of claim 18 wherein said software personality is one of Tuxedo, Jolt, or AMS.

20. The framework architecture system of claim 19 wherein said personality includes a programming attitude.

21. The framework architecture system of claim 20 wherein said programming attitude is one of C, OLE, or Cobol.

22. The framework architecture system of claim 1 wherein said implementation is a software extension.

23. A computer-implemented method of allowing a client application to communicate with a server application via a framework architecture, comprising the steps of:
providing a server engine for providing client access to the server, said server engine further including:
a server component that provides a service;
an implementation within said server component that provides functions of said service, wherein said implementation is dynamically linked and loaded into the server engine, so that the server engine is not reconfigured and recompiled;
an interface that allows a client application to access said implementation, wherein said interface is dynamically customized and loaded into the clients address space;
a realization mechanism for allowing the client application to realize said implementation, wherein said implementation includes a vtable, private data store, and per-instance data structure, and wherein the realization mechanism retrieves the information stored within the vtable, private data store, and per-instance data structure, uses this information to populate a proxy vtable, and returns a pointer to the proxy vtable to the client application; and
using said pointer to thereafter communicate with said implementation.

24. The method of claim 23 wherein:
said server component includes a plurality of implementations, and wherein said interface allows said client application to select and access one of a plurality of implementations provided by said interface.

25. The method of claim 23 wherein said implementation is a plugin implementation and can be replaced by another implementation at run time.

26. The method of claim 23 wherein said interface provides an interface definition specification for the functions provided by said implementation of said server component.

27. The method of claim 26 wherein said interface presents a data type structure according to said interface definition specification of which each member of said data type structure is a function pointer to the implementation functions implementing the services defined by said interface.

28. The method of claim 23 further comprising:
maintaining an interface namespace containing a record for said interface together with an interface identifier.

29. The method of claim 23 further including:
associating said interface with a version.

30. The method of claim 23 wherein there exists multiple implementations for said interface.

31. The method of claim 23 wherein there exists multiple interfaces providing the same implementation for said server component.

32. The method of claim 23 wherein said implementation inherits from another implementation of the same interface a subset of interface methods and functions.

33. The method of claim 25 further including:
registering an implementation as a plugin in said server engine via a registration process.

34. The method of claim 23 wherein said implementation is stored in a container that is loaded by the server engine at run-time.

35. The method of claim 34 wherein said container is a dynamic loadable library.

36. The method of claim 34 wherein said container contains multiple plugins.

37. The method of claim 23 further including:
combining said implementation function with an interceptor that adds services to said server component.

38. The method of claim 37 wherein said interceptor is a stack interceptor which during the realization of an interface implementation includes the step of:
causing each plugin in an interception sequence to be instantiated in turn.

39. The method of claim 23 further including storing implementations within a registry.

40. The method of claim 23 wherein said implementation is a software personality.

41. The method of claim 40 wherein said software personality is one of Tuxedo, Jolt, or AMS.

42. The method of claim 41 wherein said personality includes a programming attitude.

43. The method of claim 42 wherein said programming attitude is one of C, OLE, or Cobol.

44. The method of claim 23 wherein said implementation is a software extension.

45. A computer-implemented framework architecture system for allowing a client application to communicate with a server component application, comprising:
   a server engine in a server that provides client access to the server, said server engine further including
      a server component that provides a service;
      an implementation within said server component that provides functions of said service, wherein said implementation includes an interceptor for adding services to said server component, wherein said interceptor is a fanout interceptor which during the instantiation of an implementation causes a plurality of intercepting plugins as specified by an interception sequence attribute to be also instantiated, and wherein subsequent method invocations by the client results in invocation of the corresponding methods of intercepting plugins in the order specified;
      an interface that allows a client application to access said implementation;
      a realization mechanism for allowing the client application to realize said implementation, wherein said implementation includes a vtable, private data store, and per-instance data structure, and wherein the realization mechanism retrieves the information stored within the vtable, private data store, and per-instance data structure, uses this information to populate a proxy vtable, and returns a pointer to the proxy vtable to the client application; and
   wherein the client application uses this pointer to thereafter communicate with the implementation.

46. A computer-implemented method of allowing a client application to communicate with a server application via a framework architecture, comprising the steps of:
   providing a server engine that provides client access to a server, said server engine further including
      a server component that provides a service;
      an implementation within said server component that provides functions of said service, said implementation further including an interceptor that adds services to said server component, wherein said interceptor is a fanout interceptor which during the instantiation of an implementation includes the step of causing a plurality of intercepting plugins as specified by an interception sequence attribute to be also instantiated, and wherein subsequent method invocations by the client results in invocation of the corresponding methods of intercepting plugins in the order specified;
      an interface that allows a client application to access said implementation;
      a realization mechanism for allowing the client application to realize said implementation, wherein said implementation includes a vtable, private data store, and per-instance data structure, and wherein the realization mechanism retrieves the information stored within the vtable, private data store, and per-instance data structure, uses this information to populate a proxy vtable, and returns a pointer to the proxy vtable to the client application; and
   using said pointer to thereafter communicate with the implementation.

* * * * *